(12) United States Patent
Hsu et al.

(10) Patent No.: US 9,810,880 B2
(45) Date of Patent: Nov. 7, 2017

(54) IMAGING OPTICAL SYSTEM, IMAGE CAPTURING APPARATUS AND ELECTRONIC DEVICE

(71) Applicant: LARGAN PRECISION CO., LTD., Taichung (TW)

(72) Inventors: Po-Lun Hsu, Taichung (TW); Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 58 days.

(21) Appl. No.: 14/932,006

(22) Filed: Nov. 4, 2015

(65) Prior Publication Data
US 2017/0090156 A1 Mar. 30, 2017

(30) Foreign Application Priority Data

Sep. 30, 2015 (TW) .............................. 104132208 A

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
USPC ........................................ 359/713, 756, 757
See application file for complete search history.

(56) References Cited

U.S. PATENT DOCUMENTS

| | | | |
|---|---|---|---|
| 8,310,767 B2 | 11/2012 | Huang et al. | |
| 8,390,940 B2 | 3/2013 | Tsai et al. | |
| 8,472,128 B2 * | 6/2013 | Huang | G02B 13/0045 359/713 |
| 8,786,961 B2 | 7/2014 | Sano | |
| 8,908,295 B1 | 12/2014 | Tsai et al. | |
| 2014/0153117 A1 | 6/2014 | Hagiwara | |
| 2016/0091694 A1 | 3/2016 | Tang et al. | |
| 2016/0238820 A1 | 8/2016 | Tsai et al. | |
| 2017/0059828 A1 | 3/2017 | Sekine et al. | |

FOREIGN PATENT DOCUMENTS

| | | |
|---|---|---|
| CN | 104238073 A | 12/2014 |
| JP | 2014-232147 A | 12/2014 |
| WO | 2014-175058 A1 | 10/2014 |
| WO | 2015-072405 A | 4/2015 |
| WO | 2016-092944 A1 | 6/2016 |

* cited by examiner

*Primary Examiner* — Zachary Wilkes
(74) *Attorney, Agent, or Firm* — McClure, Qualey & Rodack, LLP

(57) ABSTRACT

An imaging optical system includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The third lens element has an image-side surface being concave in a paraxial region thereof. The fourth lens element has an image-side surface being concave in a paraxial region thereof. The fifth lens element has positive refractive power. The sixth lens element with negative refractive power has an image-side surface being concave in a paraxial region thereof, wherein the image-side surface of the sixth lens element includes at least one convex shape in an off-axial region thereof.

31 Claims, 19 Drawing Sheets

IMAGING OPTICAL SYSTEM, IMAGE CAPTURING APPARATUS AND ELECTRONIC DEVICE

RELATED APPLICATIONS

This application claims priority to Taiwan Application Serial Number 104132208, filed Sep. 30, 2015, which is herein incorporated by reference.

BACKGROUND

Technical Field

The present disclosure relates to an imaging optical system and an image capturing apparatus. More particularly, the present disclosure relates to a compact imaging optical system and an image capturing apparatus which is applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in electronic devices mainly adopts four-element or five-element lens structures. As the popularities of smartphones and portable devices grow, highlighting the demand for compact electronic devices, the employed optical systems with large aperture and short total track length have become the new trend. However, the conventional optical systems cannot satisfy the requirements of both large aperture and short total track length simultaneously so it is difficult to apply them to compact electronic devices.

Other conventional optical systems with six-element lens structure are also developed. However, the conventional optical systems with features of large aperture and short total track length have excessive stray light so that the image quality cannot satisfy the requirements of customers.

SUMMARY

According to one aspect of the present disclosure, an imaging optical system includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The third lens element has an image-side surface being concave in a paraxial region thereof. The fourth lens element has an image-side surface being concave in a paraxial region thereof. The fifth lens element has positive refractive power. The sixth lens element with negative refractive power has an image-side surface being concave in a paraxial region thereof, wherein an object-side surface and the image-side surface of the sixth lens element are aspheric, and the image-side surface of the sixth lens element includes at least one convex shape in an off-axial region thereof. The imaging optical system has a total of six lens elements. There is an air gap between every two of the first lens element, the second lens element, the third lens element, the fourth lens element, the fifth lens element and the sixth lens element that are adjacent to each other. When a focal length of the first lens element is f1, a focal length of the third lens element is f3, a focal length of the fourth lens element is f4, a focal length of the fifth lens element is f5, and a focal length of the sixth lens element is f6, both |f3| and |f4| are greater than |f1|, |f5| and |f6|. When an axial distance between the object-side surface of the first lens element and the image-side surface of the sixth lens element is Td, a maximum image height of the imaging optical system is ImgH, an Abbe number of the third lens element is V3, an Abbe number of the fourth lens element is V4, a curvature radius of the image-side surface of the third lens element is R6, a curvature radius of the image-side surface of the fourth lens element is R8, and a focal length of the imaging optical system is f, the following conditions are satisfied:

$Td/ImgH<1.25;$ $1.5<V3/V4<4.0;$ and $(|R6|+|R8|)/f<10.0.$

According to another aspect of the present disclosure, an image capturing apparatus includes the imaging optical system according to the aforementioned aspect and an image sensor, wherein the image sensor is disposed on an image surface of the imaging optical system.

According to another aspect of the present disclosure, an electronic device includes the image capturing apparatus according to the foregoing aspect.

DETAILED DESCRIPTION

Figure 1:
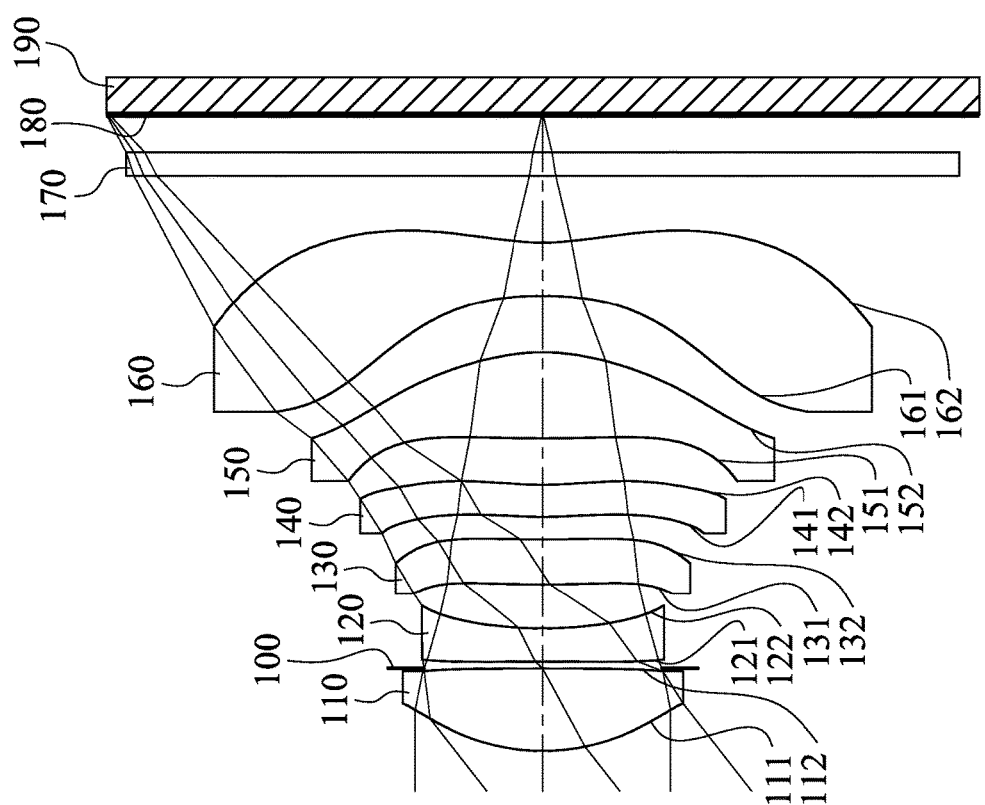
FIG. 1 is a schematic view of an image capturing apparatus according to the 1st embodiment of the present disclosure.

An imaging optical system includes, in order from an object side to an image side, a first lens element, a second lens element, a third lens element, a fourth lens element, a fifth lens element and a sixth lens element. The imaging optical system has a total of six lens elements.

According to the imaging optical system of the present disclosure, there is an air gap between every two of the first lens element, the second lens element, the third lens element, the fourth lens element, the fifth lens element and the sixth lens element that are adjacent to each other, that is, each of the first through sixth lens elements of the imaging optical system is a single and non-cemented lens element. Moreover, the manufacturing process of the cemented lenses is more complex than the non-cemented lenses. In particular, cemented surfaces of lens elements need to have accurate curvature to ensure two lens elements will be highly cemented. However, during the cementing process, those two lens elements might not be highly cemented due to displacement and it is thereby not favorable for the image quality of the imaging optical system. Therefore, there is an air gap between every two of the first lens element, the second lens element, the third lens element, the fourth lens element, the fifth lens element and the sixth lens element that are adjacent to each other in the present disclosure for avoiding the problem generated by the cemented lens elements.

The first lens element with positive refractive power has an object-side surface being convex in a paraxial region thereof. Therefore, it is favorable for adjusting the positive refractive power of the first lens element so as to reduce the total track length of the imaging optical system.

The second lens element can have negative refractive power. Therefore, it is favorable for effectively correcting aberrations of the imaging optical system.

The third lens element has an image-side surface being concave in a paraxial region thereof. Therefore, it is favorable for effectively correcting aberrations, suppressing the change of the surface shape of the third lens element and reducing the stray light of the imaging optical system so as to obtain the superior image quality and manufacturability.

The fourth lens element can have an object-side surface being convex in a paraxial region thereof and has an image-side surface being concave in a paraxial region thereof. Therefore, it is favorable for effectively correcting astigmatism, suppressing the change of the surface shape of the fourth lens element and reducing the stray light of the imaging optical system so as to obtain the superior image quality and manufacturability. Furthermore, each of the object-side surface and the image-side surface of the fourth lens element can have at least one inflection point in an off-axial region thereon. Therefore, it is favorable for effectively correcting the off-axial aberrations so as to improve the image quality in the off-axial region thereof.

The fifth lens element has positive refractive power. Therefore, it is favorable for providing a significant portion of light gathering capability of the imaging optical system so as to reduce the total track length thereof.

The sixth lens element with negative refractive power can have an object-side surface being concave in a paraxial region thereof and has an image-side surface being concave in a paraxial region thereof, and the image-side surface of the sixth lens element includes at least one convex shape in an off-axial region thereof. Therefore, it is favorable for the principal point of the imaging optical system being positioned away from the image surface so as to reduce the back focal length while maintaining the compact size and effectively correcting the off-axial aberrations.

When a focal length of the first lens element is f1, a focal length of the third lens element is f3, a focal length of the fourth lens element is f4, a focal length of the fifth lens element is f5, and a focal length of the sixth lens element is f6, both |f3| and |f4| are greater than |f1|, |f5| and |f6|. Therefore, it is favorable for obtaining the better balanced refractive power distribution of the imaging optical system so as to solve the problems of excessively correcting aberrations. Preferably, |f1| can be greater than |f5| and |f6|.

When an axial distance between the object-side surface of the first lens element and the image-side surface of the sixth lens element is Td, and a maximum image height of the imaging optical system is ImgH, the following condition is satisfied: Td/ImgH<1.25. Therefore, it is favorable for maintaining the compact size of the imaging optical system so as to obtain the short total track length while having features of a large aperture and a wide field of view. Preferably, the following condition is satisfied: Td/ImgH<1.15.

When an Abbe number of the third lens element is V3, and an Abbe number of the fourth lens element is V4, the following condition is satisfied: 1.5<V3V4<4.0. Therefore, it is favorable for reducing chromatic aberration by the configuration of the third lens element and the fourth lens element.

When a curvature radius of the image-side surface of the third lens element is R6, a curvature radius of the image-side surface of the fourth lens element is R8, and a focal length of the imaging optical system is f, the following condition is satisfied: (|R6|+|R8|)/f<10.0. Therefore, it is favorable for suppressing the change of the surface shape of the third lens element and the fourth lens element and reducing the stray light so as to obtain the superior image quality and manufacturability. Preferably, the following condition is satisfied: (|R6|+|R8|)/f<5.0.

When the focal length of the imaging optical system is f, the focal length of the third lens element is f3, and the focal length of the fourth lens element is f4, the following condition is satisfied: |f/f3|+|f/f4|<0.50. Therefore, it is favorable for reducing the photosensitivity of the third lens element and the fourth lens element so as to improve the manufacturing yield rate.

When the maximum image height of the imaging optical system is ImgH, and an entrance pupil diameter of the imaging optical system is EPD, the following condition is satisfied: 1.25<ImgH/EPD<1.75. Therefore, it is favorable for enhancing the imaging optical system with sufficient incoming light.

When a central thickness of the third lens element is CT3, a central thickness of the fourth lens element is CT4, and a central thickness of the fifth lens element is CT5, the following condition is satisfied: 0.80<CT5/(CT3+CT4)<2.0. Therefore, it is favorable for effectively utilizing the space of the imaging optical system and reducing the assembling problems due to excessively close arrangement between the lens elements.

When an f-number of the imaging optical system is Fno, the following condition is satisfied: 1.5<Fno<2.0. Therefore, it is favorable for utilizing a large aperture so as to capture clear images in low light conditions.

When a curvature radius of an object-side surface of the fifth lens element is R9, and a curvature radius of an image-side surface of the fifth lens element is R10, the following condition is satisfied: 0.25<(R9+R10)/(R9−R10)<2.0. Therefore, it is favorable for suppressing the change of the surface shape of the fifth lens element so as to reduce the surface reflection.

When the focal length of the imaging optical system is f, and the curvature radius of the image-side surface of the third lens element is R6, the following condition is satisfied: 0.20<f/R6<1.50. Therefore, it is favorable for suppressing the change of the surface shape of the third lens element so as to reduce the manufacturing sensitivity of the third lens element. Preferably, the following condition is satisfied: 0.35<f/R6<1.20.

When the central thickness of the third lens element is CT3, and the central thickness of the fourth lens element is CT4, the following condition is satisfied: CT4/CT3<1.60. Therefore, it is favorable for lens manufacturing and assembling so as to improve the manufacturing yield rate.

When the central thickness of the fourth lens element is CT4, and an axial distance between the third lens element and the fourth lens element is T34, the following condition is satisfied: 0.75<CT4/T34<2.25. Therefore, it is favorable for obtaining the sufficient space and the suitable arrangement for assembling of the third lens element and the fourth lens element so as to reduce the photosensitivity.

According to the imaging optical system of the present disclosure, the lens elements thereof can be made of plastic or glass materials. When the lens elements are made of plastic materials, the manufacturing cost can be effectively reduced. When the lens elements are made of glass materials, the arrangement of the refractive power of the imaging optical system may be more flexible to design. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the imaging optical system can also be reduced.

According to the imaging optical system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the imaging optical system of the present disclosure, the refractive power or the focal length of a lens element being positive or negative may refer to the refractive power or the focal length in a paraxial region of the lens element.

According to the imaging optical system of the present disclosure, the imaging optical system can include at least one stop, such as an aperture stop, a glare stop or a field stop. The glare stop or the field stop is for eliminating the stray light and thereby improving the image resolution thereof.

According to the imaging optical system of the present disclosure, the image surface, depending on the corresponding image sensor, can be a planar surface or a curved surface with any curvature, particularly a curved surface being concave toward the object side.

According to the imaging optical system of the present disclosure, an aperture stop can be configured as a front stop or a middle stop. A front stop disposed between an imaged object and the first lens element can provide a longer distance between an exit pupil of the imaging optical system and the image surface to enable a telecentric effect, and thereby can improve the image-sensing efficiency of an image sensor. A middle stop disposed between the first lens element and the image surface is favorable for enlarging the field of view of the imaging optical system and thereby provides a wider field of view for the same.

According to the imaging optical system of the present disclosure, the imaging optical system can be optionally applied to moving focus optical systems. Furthermore, the imaging optical system is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

According to the present disclosure, an image capturing apparatus is provided. The image capturing apparatus includes the aforementioned imaging optical system according to the present disclosure and an image sensor, wherein the image sensor is disposed on or near an image surface of the aforementioned imaging optical system. In the imaging optical system of the image capturing apparatus, it is favorable for suppressing the change of the surface shape of the third lens element and the fourth lens element and reducing the stray light by the concave image-side surface of the third lens element and the concave image-side surface of fourth lens element so as to obtain the superior image quality and manufacturability. Moreover, it is favorable for maintaining the compact size of the imaging optical system so as to obtain the features of a large aperture, a wide field of view and a short total track length. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for obtaining the features of a large aperture, a wide field of view and a short total track length. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
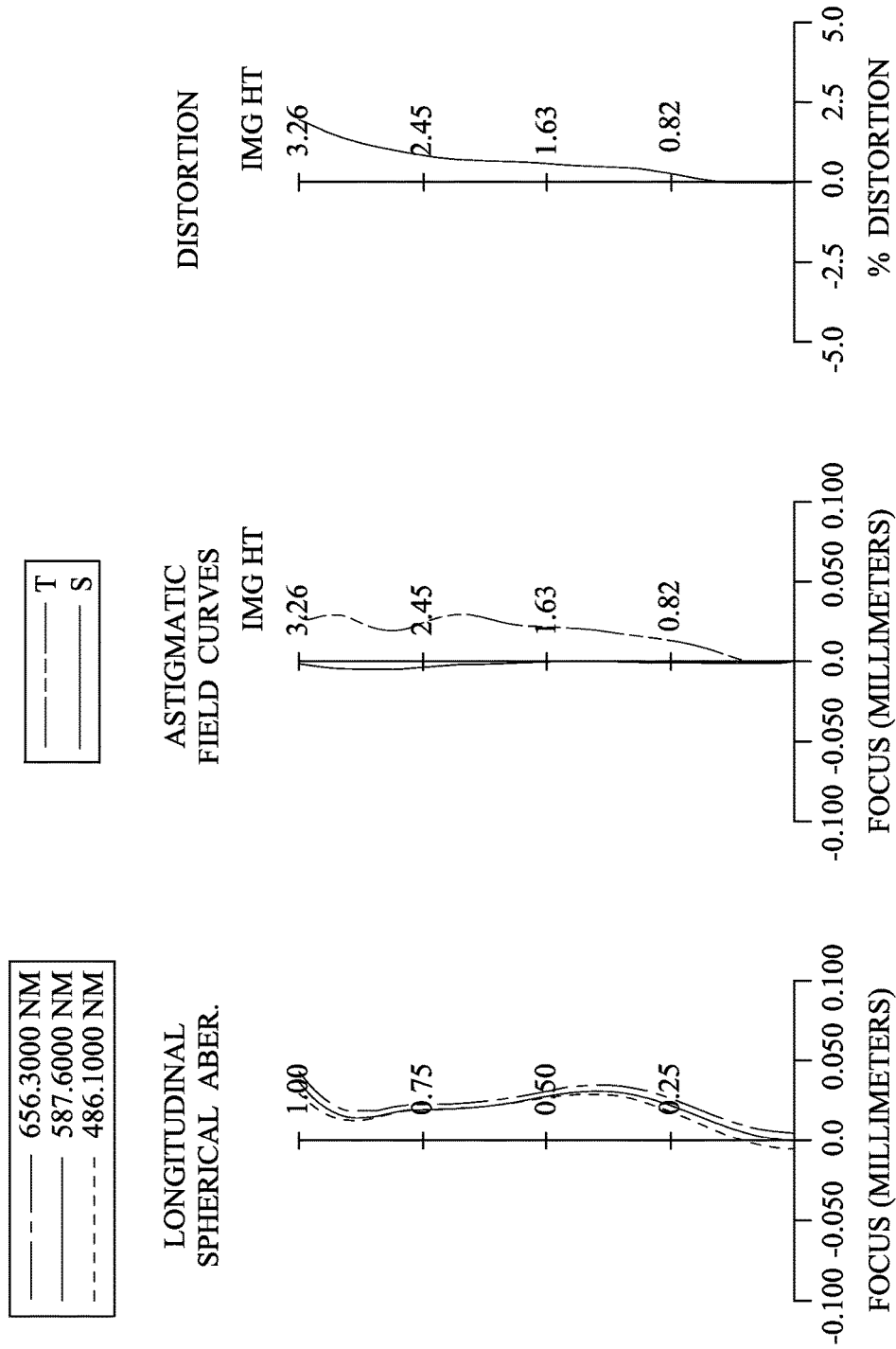
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment. In FIG. 1, the image capturing apparatus includes the imaging optical system (its reference numeral is omitted) and an image sensor 190. The imaging optical system includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180. The image sensor 190 is disposed on the image surface 180 of the imaging optical system. The imaging optical system has a total of six lens elements (110-160). Moreover, there is an air gap on the optical axis between every two of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric.

The second lens element 120 with negative refractive power has an object-side surface 121 being planar in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, each of the object-side surface 141 and the image-side surface 142 of the fourth lens element 140 has at least one inflection point in an off-axial region thereon. The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axial region thereof.

The IR-cut filter 170 is made of a glass material and located between the sixth lens element 160 and the image surface 180, and will not affect the focal length of the imaging optical system.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical system of the image capturing apparatus according to the 1st embodiment, when a focal length of the imaging optical system is f, an f-number of the imaging optical system is Fno, and half of a maximal field of view of the imaging optical system is HFOV, these parameters have the following values: f=4.08 mm; Fno=2.13; and HFOV=38.0 degrees.

In the imaging optical system of the image capturing apparatus according to the 1st embodiment, when an Abbe number of the third lens element 130 is V3, and an Abbe number of the fourth lens element 140 is V4, the following condition is satisfied: V3/V4=2.37.

In the imaging optical system of the image capturing apparatus according to the 1st embodiment, when a central thickness of the third lens element 130 is CT3, and a central thickness of the fourth lens element 140 is CT4, the following condition is satisfied: CT4/CT3=0.71.

In the imaging optical system of the image capturing apparatus according to the 1st embodiment, when the central thickness of the third lens element 130 is CT3, the central thickness of the fourth lens element 140 is CT4, and a central thickness of the fifth lens element 150 is CT5, the following condition is satisfied: CT5/(CT3+CT4)=1.11.

In the imaging optical system of the image capturing apparatus according to the 1st embodiment, when the central thickness of the fourth lens element 140 is CT4, and an axial distance between the third lens element 130 and the fourth lens element 140 is T34, the following condition is satisfied: CT4/T34=1.42.

In the imaging optical system of the image capturing apparatus according to the 1st embodiment, when a maximum image height of the imaging optical system is ImgH (half of a diagonal length of an effective photosensitive area of the image sensor 190), and an entrance pupil diameter of the imaging optical system is EPD, the following condition is satisfied: ImgH/EPD=1.70.

In the imaging optical system of the image capturing apparatus according to the 1st embodiment, when an axial distance between the object-side surface 111 of the first lens element 110 and the image-side surface 162 of the sixth lens element 160 is Td, and the maximum image height of the imaging optical system is ImgH, the following condition is satisfied: Td/ImgH=1.17.

In the imaging optical system of the image capturing apparatus according to the 1st embodiment, when a curvature radius of the image-side surface 132 of the third lens element 130 is R6, a curvature radius of the image-side surface 142 of the fourth lens element 140 is R8, and the focal length of the imaging optical system is f, the following condition is satisfied: (|R6|+|R8|)/f=3.36.

In the imaging optical system of the image capturing apparatus according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9−R10)=0.74.

In the imaging optical system of the image capturing apparatus according to the 1st embodiment, when the focal length of the imaging optical system is f, and the curvature radius of the image-side surface 132 of the third lens element 130 is R6, the following condition is satisfied: f/R6=0.38.

In the imaging optical system of the image capturing apparatus according to the 1st embodiment, when the focal length of the imaging optical system is f, a focal length of the third lens element 130 is f3, and a focal length of the fourth lens element 140 is f4, the following condition is satisfied: |f/f3|+|f/f4|=0.21.

In the imaging optical system of the image capturing apparatus according to the 1st embodiment, when a focal length of the first lens element 110 is f1, the focal length of the third lens element 130 is f3, the focal length of the fourth lens element 140 is f4, a focal length of the fifth lens element 150 is f5, and a focal length of the sixth lens element 160 is f6, both |f3| and |f4| are greater than |f1|, |f5| and |f6|; |f1| is greater than |f5| and |f6|. (According to the following TABLE 1, |f3|=60.51, |f4|=29.59, |f1|=2.92, |f5|=2.76, and |f6|=2.19.)

The detailed optical data of the 1st embodiment are shown in TABLE 1 and the aspheric surface data are shown in TABLE 2 below.

TABLE 1

1st Embodiment
f = 4.08 mm, Fno = 2.13, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.567 | ASP | 0.618 | Plastic | 1.530 | 55.8 | 2.92 |
| 2 | | −100.000 | ASP | 0.000 | | | | |
| 3 | Ape. Stop | Plano | | 0.050 | | | | |
| 4 | Lens 2 | ∞ | ASP | 0.250 | Plastic | 1.639 | 23.5 | −5.10 |
| 5 | | 3.259 | ASP | 0.331 | | | | |
| 6 | Lens 3 | 8.145 | ASP | 0.339 | Plastic | 1.530 | 55.8 | 60.51 |
| 7 | | 10.760 | ASP | 0.169 | | | | |
| 8 | Lens 4 | 3.597 | ASP | 0.240 | Plastic | 1.639 | 23.5 | −29.59 |
| 9 | | 2.944 | ASP | 0.347 | | | | |
| 10 | Lens 5 | 10.985 | ASP | 0.644 | Plastic | 1.530 | 55.8 | 2.76 |
| 11 | | −1.651 | ASP | 0.425 | | | | |
| 12 | Lens 6 | −2.985 | ASP | 0.400 | Plastic | 1.514 | 56.8 | −2.19 |
| 13 | | 1.887 | ASP | 0.500 | | | | |
| 14 | IR-cut filter | Plano | | 0.175 | Glass | 1.517 | 64.2 | — |
| 15 | | Plano | | 0.283 | | | | |
| 16 | Image | Plano | | — | | | | |

Reference wavelength is 587.6 nm (d-line).

TABLE 2

| Aspheric Coefficients | | | | | | |
|---|---|---|---|---|---|---|
| Surface # | 1 | 2 | 4 | 5 | 6 | 7 |
| k = | 6.5214E−01 | −4.8202E+00 | 0.0000E+00 | −7.7242E+00 | −4.7515E+01 | −1.0000E+00 |
| A4 = | −2.9943E−02 | −2.9087E−02 | −3.1167E−02 | 3.7693E−02 | −5.7217E−02 | −1.3872E−01 |
| A6 = | 1.7071E−02 | 2.3928E−02 | 1.0960E−01 | 1.4564E−02 | −2.9651E−02 | 1.6992E−01 |
| A8 = | −7.2150E−02 | 3.9196E−02 | −6.0587E−02 | 1.1583E−01 | −1.5834E−01 | −3.2366E−01 |
| A10 = | 3.2508E−02 | −1.5810E−01 | −1.9148E−02 | −1.8231E−01 | 2.3416E−01 | 1.4386E−01 |
| A12 = | 1.2836E−02 | 1.2721E−01 | 5.1443E−02 | 1.5274E−01 | −2.6435E−01 | 1.8983E−02 |
| A14 = | −3.3418E−02 | −3.8886E−02 | −1.2000E−02 | −2.1958E−02 | 1.3853E−01 | −1.8630E−02 |

| Surface # | 8 | 9 | 10 | 11 | 12 | 13 |
|---|---|---|---|---|---|---|
| k = | −3.3429E+01 | −6.5823E+00 | −1.0602E+00 | −9.5568E+00 | −3.5361E+01 | −1.6052E+01 |
| A4 = | −2.7479E−01 | −3.1051E−01 | −1.8342E−02 | −1.2858E−01 | −3.7537E−01 | −1.1497E−01 |
| A6 = | 2.4672E−01 | 2.1062E−01 | −1.4427E−01 | 1.2385E−01 | 3.2483E−01 | 6.3847E−02 |
| A8 = | 6.3285E−02 | 6.7819E−02 | 2.2131E−01 | −1.0559E−01 | −2.0533E−01 | −2.5398E−02 |
| A10 = | −5.0131E−01 | −3.3387E−01 | −2.1941E−01 | 5.8906E−02 | 8.8950E−02 | 6.2878E−03 |
| A12 = | 5.2265E−01 | 3.3373E−01 | 1.2721E−01 | −1.8975E−02 | −2.2591E−02 | −9.3580E−04 |
| A14 = | −2.0945E−01 | −1.4516E−01 | −3.9839E−02 | 3.4146E−03 | 3.0087E−03 | 7.4940E−05 |
| A16 = | 2.4245E−02 | 2.3333E−02 | 5.1074E−03 | −2.7398E−04 | −1.6283E−04 | −2.4296E−06 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
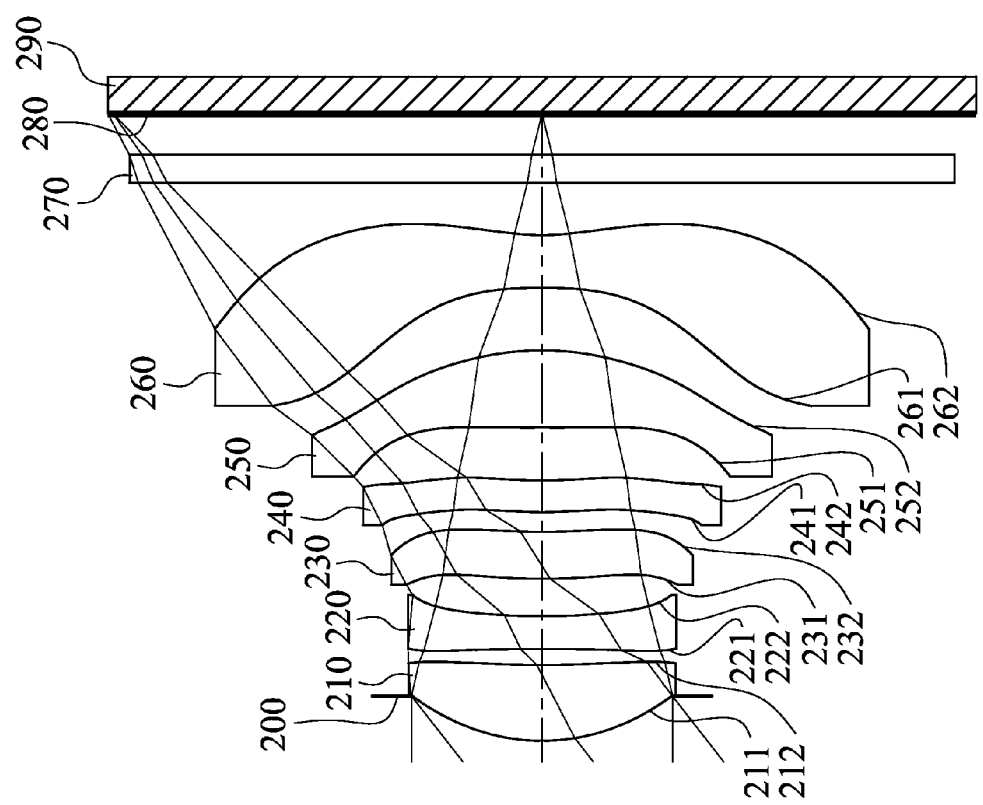
FIG. 3 is a schematic view of an image capturing apparatus according to the 2nd embodiment of the present disclosure.
Figure 4:
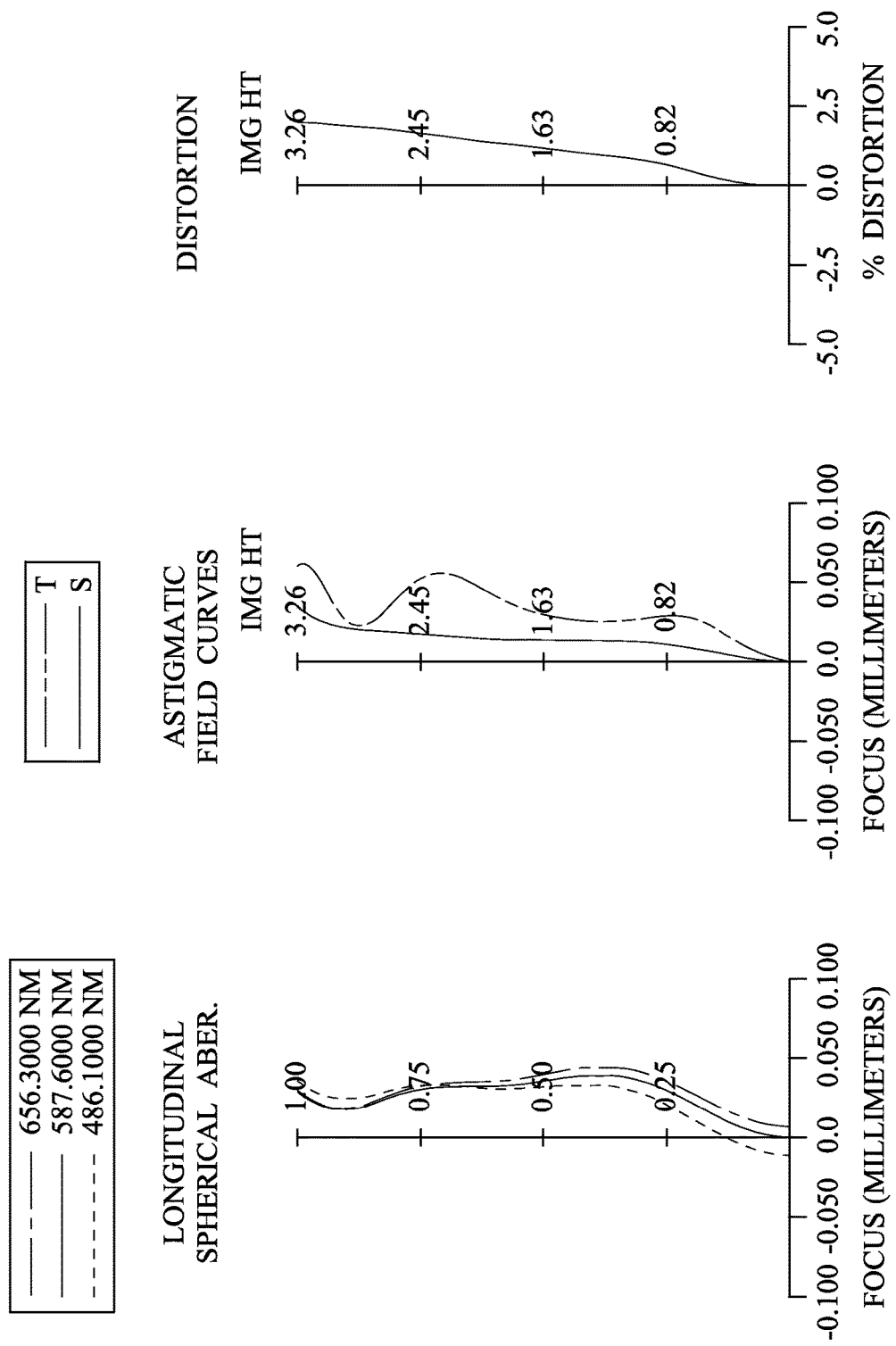
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes the imaging optical system (its reference numeral is omitted) and an image sensor 290. The imaging optical system includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280. The image sensor 290 is disposed on the image surface 280 of the imaging optical system. The imaging optical system has a total of six lens elements (210-260). Moreover, there is an air gap on the optical axis between every two of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric. Furthermore, each of the object-side surface 241 and the image-side surface 242 of the fourth lens element 240 has at least one inflection point in an off-axial region thereon.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof.

The IR-cut filter 270 is made of a glass material and located between the sixth lens element 260 and the image surface 280, and will not affect the focal length of the imaging optical system.

Furthermore, in the imaging optical system of the image capturing apparatus according to the 2nd embodiment, when a focal length of the first lens element 210 is f1, a focal length of the third lens element 230 is f3, a focal length of the fourth lens element 240 is f4, a focal length of the fifth lens element 250 is f5, and a focal length of the sixth lens element 260 is f6, both |f3| and |f4| are greater than |f1|, |f5| and |f6|; |f1| is greater than |f5| and |f6|.

The detailed optical data of the 2nd embodiment are shown in TABLE 3 and the aspheric surface data are shown in TABLE 4 below.

TABLE 3

2nd Embodiment
f = 4.06 mm, Fno = 2.05, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.339 | | | | |
| 2 | Lens 1 | 1.568 | ASP | 0.577 | Plastic | 1.544 | 55.9 | 3.51 |
| 3 | | 7.583 | ASP | 0.120 | | | | |
| 4 | Lens 2 | −86.231 | ASP | 0.250 | Plastic | 1.661 | 20.4 | −6.78 |
| 5 | | 4.733 | ASP | 0.284 | | | | |
| 6 | Lens 3 | 3.985 | ASP | 0.359 | Plastic | 1.544 | 55.9 | 34.19 |
| 7 | | 4.910 | ASP | 0.150 | | | | |
| 8 | Lens 4 | 3.134 | ASP | 0.240 | Plastic | 1.584 | 28.2 | 145.18 |
| 9 | | 3.162 | ASP | 0.403 | | | | |
| 10 | Lens 5 | 19.192 | ASP | 0.588 | Plastic | 1.544 | 55.9 | 3.37 |
| 11 | | −2.004 | ASP | 0.476 | | | | |

TABLE 3-continued

2nd Embodiment
f = 4.06 mm, Fno = 2.05, HFOV = 38.0 deg.

| Surface # | | Curvature Radius | | Thickness | Material | Index | Abbe # | Focal Length |
|---|---|---|---|---|---|---|---|---|
| 12 | Lens 6 | −4.506 | ASP | 0.400 | Plastic | 1.544 | 55.9 | −2.39 |
| 13 | | 1.882 | ASP | 0.400 | | | | |
| 14 | IR-cut filter | Plano | | 0.210 | Glass | 1.517 | 64.2 | — |
| 15 | | Plano | | 0.313 | | | | |
| 16 | Image | Plano | | — | | | | |

Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 6.4312E−01 | −1.1897E+01 | 9.0000E+01 | −3.6166E+01 | −5.0000E+01 | −6.2206E+01 |
| A4 = | −2.8500E−02 | −5.2257E−02 | −1.0242E−01 | −2.7257E−02 | −1.6246E−02 | −1.4485E−01 |
| A6 = | 2.8033E−02 | 2.0897E−02 | 1.9801E−01 | 1.3997E−01 | −6.7856E−02 | 2.0552E−01 |
| A8 = | −8.2725E−02 | 5.8090E−02 | −1.3570E−01 | −2.3695E−02 | −9.8264E−02 | −3.2463E−01 |
| A10 = | 4.8330E−02 | −1.6367E−01 | 6.7405E−02 | −1.2324E−01 | 1.9542E−01 | 1.3119E−01 |
| A12 = | 1.2865E−02 | 1.2721E−01 | 5.1443E−02 | 1.5274E−01 | −2.6435E−01 | 1.8951E−02 |
| A14 = | −3.3418E−02 | −3.8886E−02 | −1.2000E−02 | −2.1958E−02 | 1.3853E−01 | −1.8630E−02 |

| Surface # | 8 | 9 | 10 | 11 | 12 | 13 |
|---|---|---|---|---|---|---|
| k = | −4.4557E+01 | −6.5964E+00 | −1.0602E+00 | −1.3879E+01 | −3.7898E+01 | −1.5419E+01 |
| A4 = | −2.7522E−01 | −3.3210E−01 | −2.4597E−02 | −1.2564E−01 | −3.3129E−01 | −1.2373E−01 |
| A6 = | 1.9553E−01 | 2.3408E−01 | −7.7724E−02 | 1.5038E−01 | 2.4915E−01 | 6.5362E−02 |
| A8 = | 5.8298E−02 | −5.6442E−02 | 3.5887E−02 | −1.7464E−01 | −1.4999E−01 | −2.4828E−02 |
| A10 = | −2.0930E−01 | −5.7302E−02 | −2.7570E−02 | 1.0839E−01 | 6.5012E−02 | 6.0096E−03 |
| A12 = | 1.3873E−01 | 1.1315E−01 | 2.9317E−02 | −3.4301E−02 | −1.6383E−02 | −8.8882E−04 |
| A14 = | −1.6209E−02 | −7.1898E−02 | −1.5471E−02 | 5.4967E−03 | 2.1317E−03 | 7.1246E−05 |
| A16 = | −1.1271E−02 | 1.5056E−02 | 2.8451E−03 | −3.6967E−04 | −1.1142E−04 | −2.3150E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 4.06 | (|R6| + |R8|)/f | 1.99 |
| Fno | 2.05 | (R9 + R10)/(R9 − R10) | 0.81 |
| HFOV (deg.) | 38.0 | f/R6 | 0.83 |
| V3/V4 | 1.98 | |f/f3| + |f/f4| | 0.15 |
| CT4/CT3 | 0.67 | |f1| | 3.51 |
| CT5/(CT3 + CT4) | 0.98 | |f3| | 34.19 |
| CT4/T34 | 1.60 | |f4| | 145.18 |
| ImgH/EPD | 1.65 | |f5| | 3.37 |
| Td/ImgH | 1.18 | |f6| | 2.39 |

3rd Embodiment

Figure 5:
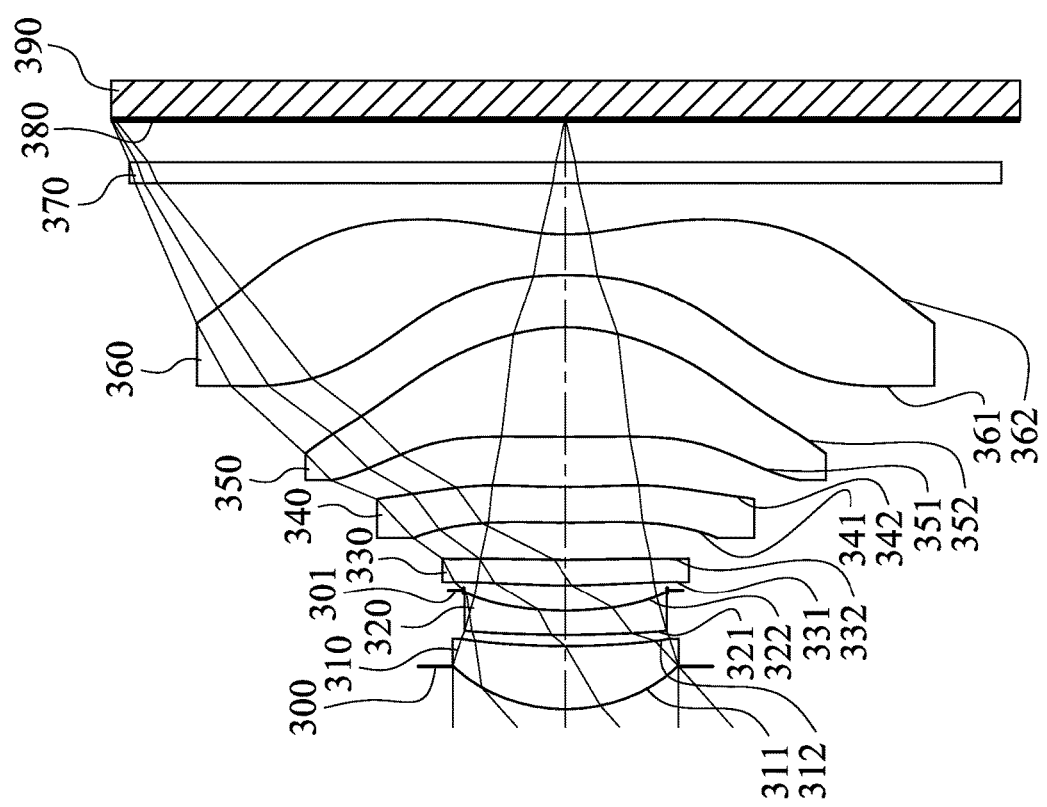
FIG. 5 is a schematic view of an image capturing apparatus according to the 3rd embodiment of the present disclosure.
Figure 6:
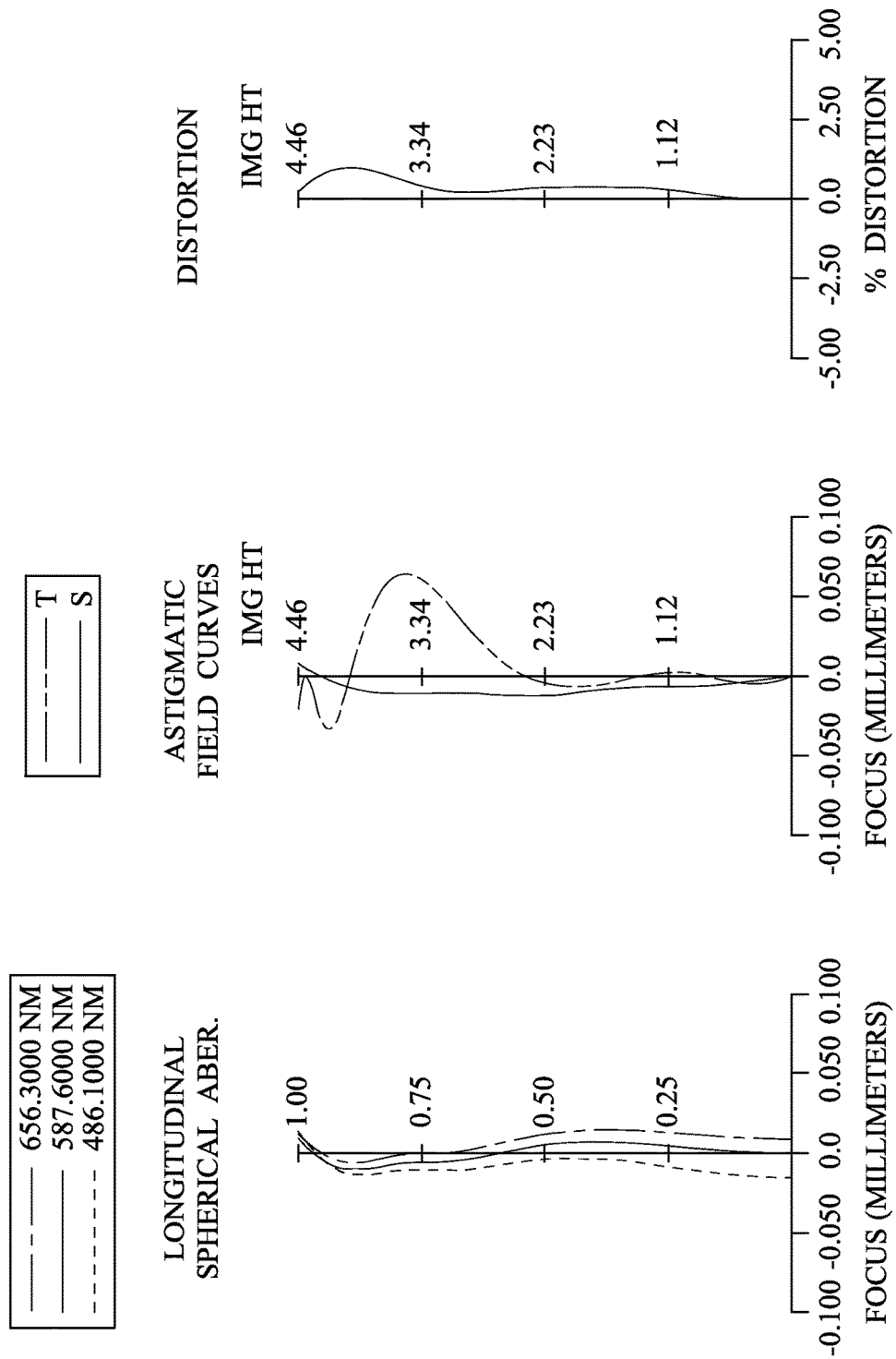
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to the 3rd embodiment. In FIG. 5, the image capturing apparatus includes the imaging optical system (its reference numeral is omitted) and an image sensor 390. The imaging optical system includes, in order from an object side to an image side, an aperture stop 300, a first lens element 310, a second lens element 320, a stop 301, a third lens element 330, a fourth lens element 340, a fifth lens element 350, a sixth lens element 360, an IR-cut filter 370 and an image surface 380. The image sensor 390 is disposed on the image surface 380 of the imaging optical system. The imaging optical system has a total of six lens elements (310-360). Moreover, there is an air gap on the optical axis between every two of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, each of the object-side surface 341 and the image-side surface 342 of the fourth lens element 340 has at least one inflection point in an off-axial region thereon. The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of a glass material and located between the sixth lens element 360 and the image surface 380, and will not affect the focal length of the imaging optical system.

Furthermore, in the imaging optical system of the image capturing apparatus according to the 3rd embodiment, when a focal length of the first lens element 310 is f1, a focal length of the third lens element 330 is f3, a focal length of the fourth lens element 340 is f4, a focal length of the fifth lens element 350 is f5, and a focal length of the sixth lens element 360 is f6, both |f3| and |f4| are greater than |f1|, |f5| and |f6|; |f1| is greater than |f5| and |f6|.

The detailed optical data of the 3rd embodiment are shown in TABLE 5 and the aspheric surface data are shown in TABLE 6 below.

TABLE 5

3rd Embodiment
f = 4.99 mm, Fno = 2.25, HFOV = 41.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.422 | | | | |
| 2 | Lens 1 | 1.733 | ASP | 0.619 | Plastic | 1.544 | 55.9 | 4.02 |
| 3 | | 7.276 | ASP | 0.110 | | | | |
| 4 | Lens 2 | 9.387 | ASP | 0.240 | Plastic | 1.639 | 23.5 | −7.71 |
| 5 | | 3.199 | ASP | 0.200 | | | | |
| 6 | Stop | Plano | | 0.050 | | | | |
| 7 | Lens 3 | 6.950 | ASP | 0.253 | Plastic | 1.544 | 55.9 | 29.47 |
| 8 | | 12.107 | ASP | 0.364 | | | | |
| 9 | Lens 4 | 8.510 | ASP | 0.351 | Plastic | 1.639 | 23.5 | −32.21 |
| 10 | | 5.924 | ASP | 0.494 | | | | |
| 11 | Lens 5 | 29.329 | ASP | 1.075 | Plastic | 1.544 | 55.9 | 3.29 |
| 12 | | −1.879 | ASP | 0.517 | | | | |
| 13 | Lens 6 | −4.064 | ASP | 0.400 | Plastic | 1.544 | 55.9 | −2.55 |
| 14 | | 2.185 | ASP | 0.500 | | | | |
| 15 | IR-cut filter | Plano | | 0.210 | Glass | 1.517 | 64.2 | — |
| 16 | | Plano | | 0.416 | | | | |
| 17 | Image | Plano | | — | | | | |

Reference wavelength is 587.6 nm (d-line).
Effective radius of Surface 6 is 1.000 mm.

TABLE 6

Aspheric Coefficients

| Surface # | 2 | 3 | 4 | 5 | 7 | 8 |
|---|---|---|---|---|---|---|
| k = | 1.1936E−01 | 7.8221E+00 | −1.0000E+00 | −5.9078E−01 | −3.0079E+01 | −1.3264E+01 |
| A4 = | −8.2449E−04 | −3.4379E−02 | −6.9840E−02 | −3.8745E−02 | −3.6812E−02 | −6.0177E−02 |
| A6 = | 1.5721E−02 | 5.6453E−02 | 1.1254E−01 | 1.1688E−01 | 1.1822E−02 | 7.9236E−02 |
| A8 = | −1.6845E−02 | −6.1367E−02 | −7.4690E−02 | −1.0766E−01 | 2.0352E−02 | −9.6107E−02 |
| A10 = | 1.0522E−02 | 5.5659E−02 | 2.5242E−02 | 1.1092E−01 | −9.0261E−02 | 5.3913E−02 |
| A12 = | −1.7940E−04 | −2.0779E−02 | 5.0194E−03 | −7.2997E−02 | 9.4774E−02 | −9.0117E−03 |
| A14 = | | | −8.4522E−03 | 2.4443E−02 | −2.9855E−02 | 1.4231E−04 |

| Surface # | 9 | 10 | 11 | 12 | 13 | 14 |
|---|---|---|---|---|---|---|
| k = | −3.6847E+01 | −7.5488E+01 | −2.3572E+00 | −3.7051E+00 | −8.8531E+00 | −1.1072E+01 |
| A4 = | −1.3503E−01 | −8.7957E−02 | −2.3423E−02 | 3.0629E−03 | −8.7054E−02 | −5.6755E−02 |
| A6 = | 1.2287E−01 | 4.4815E−02 | −1.0300E−02 | −1.7389E−02 | 2.1752E−02 | 1.8146E−02 |
| A8 = | −1.2435E−01 | −2.7212E−02 | 2.2145E−03 | 4.6903E−03 | −1.7465E−03 | −3.9012E−03 |
| A10 = | 1.0175E−01 | 1.6285E−02 | 5.8833E−04 | 7.8721E−05 | −3.5878E−05 | 5.1280E−04 |
| A12 = | −5.3522E−02 | −5.5091E−03 | −2.0043E−04 | −1.5372E−04 | 1.4580E−05 | −4.0434E−05 |

TABLE 6-continued

| Aspheric Coefficients | | | | | | |
|---|---|---|---|---|---|---|
| A14 = | 1.5564E−02 | 9.2318E−04 | 1.9734E−05 | 1.7274E−05 | −8.5546E−07 | 1.7616E−06 |
| A16 = | −1.9136E−03 | −6.2308E−05 | −6.5887E−07 | −5.4822E−07 | 1.6115E−08 | −3.2397E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 4.99 | (|R6| + |R8|)/f | 3.61 |
| Fno | 2.25 | (R9 + R10)/(R9 − R10) | 0.88 |
| HFOV (deg.) | 41.7 | f/R6 | 0.41 |
| V3/V4 | 2.38 | |f/f3| + |f/f4| | 0.32 |
| CT4/CT3 | 1.39 | |f1| | 4.02 |
| CT5/(CT3 + CT4) | 1.78 | |f3| | 29.47 |
| CT4/T34 | 0.96 | |f4| | 32.21 |
| ImgH/EPD | 2.01 | |f5| | 3.29 |
| Td/ImgH | 1.05 | |f6| | 2.55 |

4th Embodiment

Figure 7:
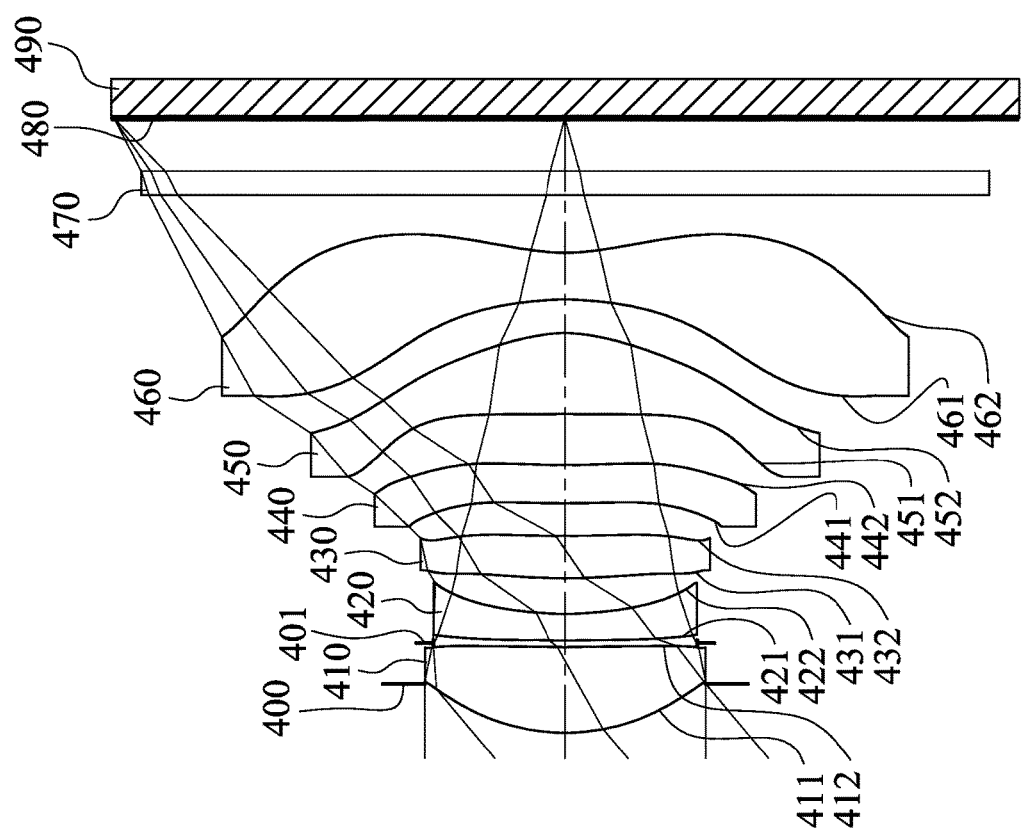
FIG. 7 is a schematic view of an image capturing apparatus according to the 4th embodiment of the present disclosure.
Figure 8:
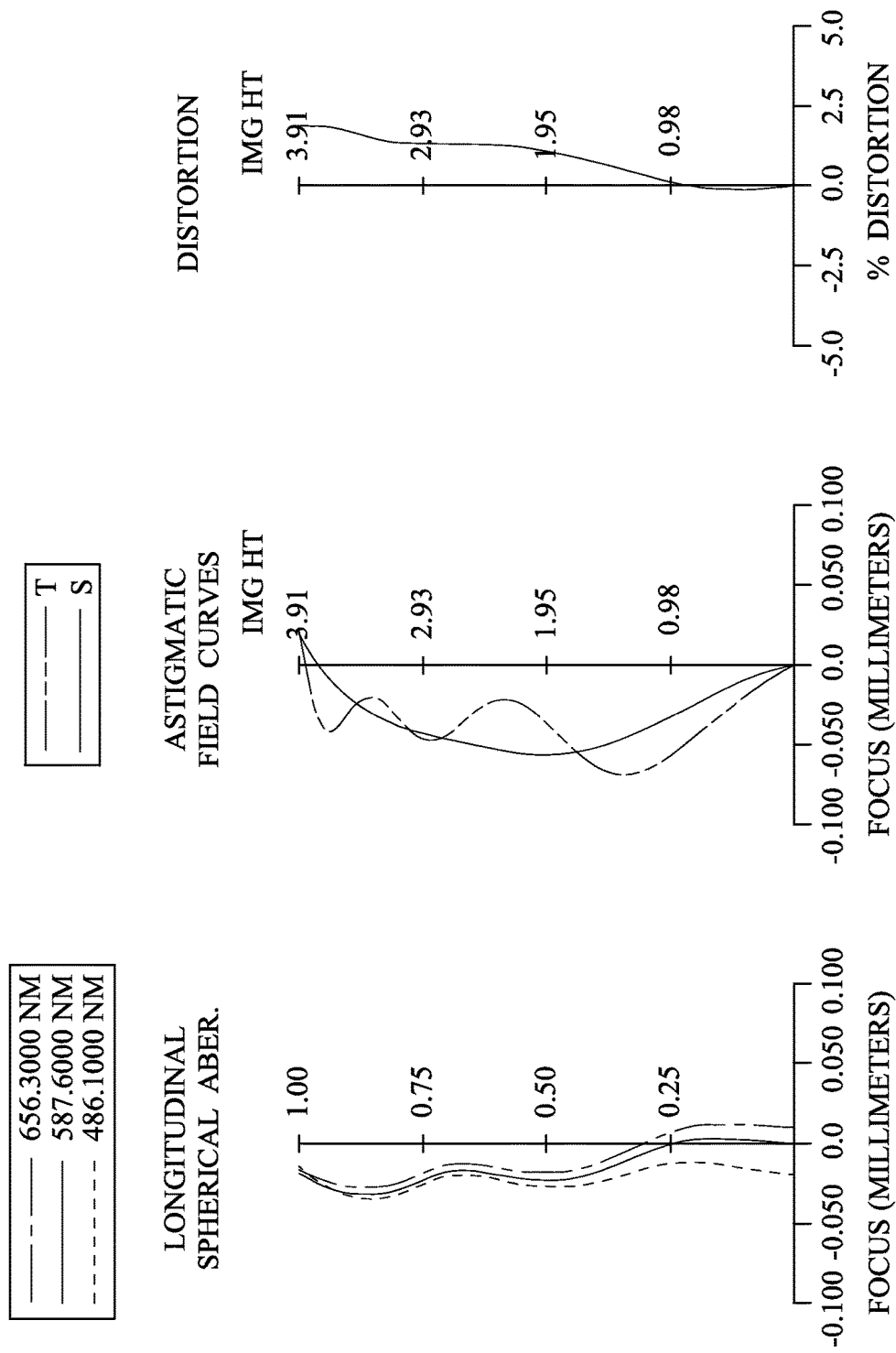
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment. In FIG. 7, the image capturing apparatus includes the imaging optical system (its reference numeral is omitted) and an image sensor 490. The imaging optical system includes, in order from an object side to an image side, an aperture stop 400, a first lens element 410, a stop 401, a second lens element 420, a third lens element 430, a fourth lens element 440, a fifth lens element 450, a sixth lens element 460, an IR-cut filter 470 and an image surface 480. The image sensor 490 is disposed on the image surface 480 of the imaging optical system. The imaging optical system has a total of six lens elements (410-460). Moreover, there is an air gap on the optical axis between every two of the first lens element 410, the second lens element 420, the third lens element 430, the fourth lens element 440, the fifth lens element 450 and the sixth lens element 460 that are adjacent to each other.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, each of the object-side surface 441 and the image-side surface 442 of the fourth lens element 440 has at least one inflection point in an off-axial region thereon.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof.

The IR-cut filter 470 is made of a glass material and located between the sixth lens element 460 and the image surface 480, and will not affect the focal length of the imaging optical system.

Furthermore, in the imaging optical system of the image capturing apparatus according to the 4th embodiment, when a focal length of the first lens element 410 is f1, a focal length of the third lens element 430 is f3, a focal length of the fourth lens element 440 is f4, a focal length of the fifth lens element 450 is f5, and a focal length of the sixth lens element 460 is f6, both |f3| and |f4| are greater than |f1|, |f5| and |f6|; |f1| is greater than |f5| and |f6|.

The detailed optical data of the 4th embodiment are shown in TABLE 7 and the aspheric surface data are shown in TABLE 8 below.

TABLE 7

4th Embodiment
f = 4.59 mm, Fno = 1.89, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.425 | | | | |
| 2 | Lens 1 | 1.788 | ASP | 0.741 | Plastic | 1.544 | 55.9 | 3.95 |
| 3 | | 9.086 | ASP | 0.035 | | | | |
| 4 | Stop | Plano | | 0.021 | | | | |
| 5 | Lens 2 | 6.193 | ASP | 0.230 | Plastic | 1.639 | 23.5 | −7.40 |
| 6 | | 2.642 | ASP | 0.308 | | | | |
| 7 | Lens 3 | 4.690 | ASP | 0.367 | Plastic | 1.544 | 55.9 | 18.60 |
| 8 | | 8.499 | ASP | 0.282 | | | | |
| 9 | Lens 4 | 7.178 | ASP | 0.330 | Plastic | 1.639 | 23.5 | −64.79 |
| 10 | | 6.008 | ASP | 0.446 | | | | |
| 11 | Lens 5 | −64.372 | ASP | 0.701 | Plastic | 1.544 | 55.9 | 2.43 |
| 12 | | −1.300 | ASP | 0.290 | | | | |
| 13 | Lens 6 | −2.509 | ASP | 0.404 | Plastic | 1.544 | 55.9 | −1.91 |
| 14 | | 1.880 | ASP | 0.500 | | | | |
| 15 | IR-cut filter | Plano | | 0.210 | Glass | 1.517 | 64.2 | — |
| 16 | | Plano | | 0.454 | | | | |
| 17 | Image | Plano | | — | | | | |

Reference wavelength is 587.6 nm (d-line).
Effective radius of Surface 4 is 1.140 mm.

TABLE 8

Aspheric Coefficients

| Surface # | 2 | 3 | 5 | 6 | 7 | 8 |
|---|---|---|---|---|---|---|
| k = | −8.0269E+00 | −7.4610E+01 | −1.3731E+01 | −3.2266E+00 | −8.2589E+01 | −1.0021E+01 |
| A4 = | 1.7161E−01 | −1.8972E−01 | −3.1522E−01 | −1.4820E−01 | 1.6580E−02 | −1.2462E−01 |
| A6 = | −1.4641E−01 | 4.5034E−01 | 7.9392E−01 | 3.9252E−01 | −9.5029E−02 | 2.4765E−01 |
| A8 = | 1.5051E−01 | −5.6805E−01 | −1.1064E+00 | −4.6690E−01 | 9.2375E−02 | −5.4489E−01 |
| A10 = | −1.2110E−01 | 3.7667E−01 | 9.3896E−01 | 3.1291E−01 | −3.3435E−02 | 6.9096E−01 |
| A12 = | 6.0311E−02 | −9.1365E−02 | −4.3708E−01 | −7.5864E−02 | −9.6619E−02 | −5.4564E−01 |
| A14 = | −1.4267E−02 | −2.9596E−02 | 8.3944E−02 | −2.9137E−03 | 1.3440E−01 | 2.4632E−01 |
| A16 = | | 1.4820E−02 | | | −4.4414E−02 | −4.4914E−02 |

| Surface # | 9 | 10 | 11 | 12 | 13 | 14 |
|---|---|---|---|---|---|---|
| k = | −1.8174E+01 | −5.6730E+00 | −9.9000E+01 | −4.7327E+00 | −2.7352E+01 | −9.5634E+00 |
| A4 = | −1.3485E−01 | −1.0099E−01 | 2.4010E−01 | 6.1338E−02 | −4.9362E−02 | −6.1926E−02 |
| A6 = | −1.8037E−02 | −8.1708E−02 | −5.8911E−02 | −6.5790E−02 | −3.5616E−02 | 1.7655E−02 |
| A8 = | 1.9753E−01 | 2.3602E−01 | 1.8865E−02 | 2.3906E−02 | 2.7124E−02 | −3.8227E−03 |
| A10 = | −2.8588E−01 | −2.6032E−01 | 1.0002E−03 | −5.5707E−03 | −6.9693E−03 | 5.3389E−04 |
| A12 = | 1.7122E−01 | 1.4955E−01 | −5.0579E−03 | 1.3026E−03 | 8.9929E−04 | −5.0235E−05 |
| A14 = | −3.6861E−02 | −4.2485E−02 | 1.9682E−03 | −2.1508E−04 | −5.9138E−05 | 2.8351E−06 |
| A16 = | | 4.6744E−03 | −2.2231E−04 | 1.4314E−05 | 1.5854E−06 | −6.3544E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.59 | (|R6| + |R8|)/f | 3.16 |
| Fno | 1.89 | (R9 + R10)/(R9 − R10) | 1.04 |
| HFOV (deg.) | 40.0 | f/R6 | 0.54 |
| V3/V4 | 2.38 | |f/f3| + |f/f4| | 0.32 |

-continued

| 4th Embodiment | | | |
|---|---|---|---|
| CT4/CT3 | 0.90 | |f1| | 3.95 |
| CT5/(CT3 + CT4) | 1.01 | |f3| | 18.60 |
| CT4/T34 | 1.17 | |f4| | 64.79 |
| ImgH/EPD | 1.61 | |f5| | 2.43 |
| Td/ImgH | 1.06 | |f6| | 1.91 |

5th Embodiment

Figure 9:
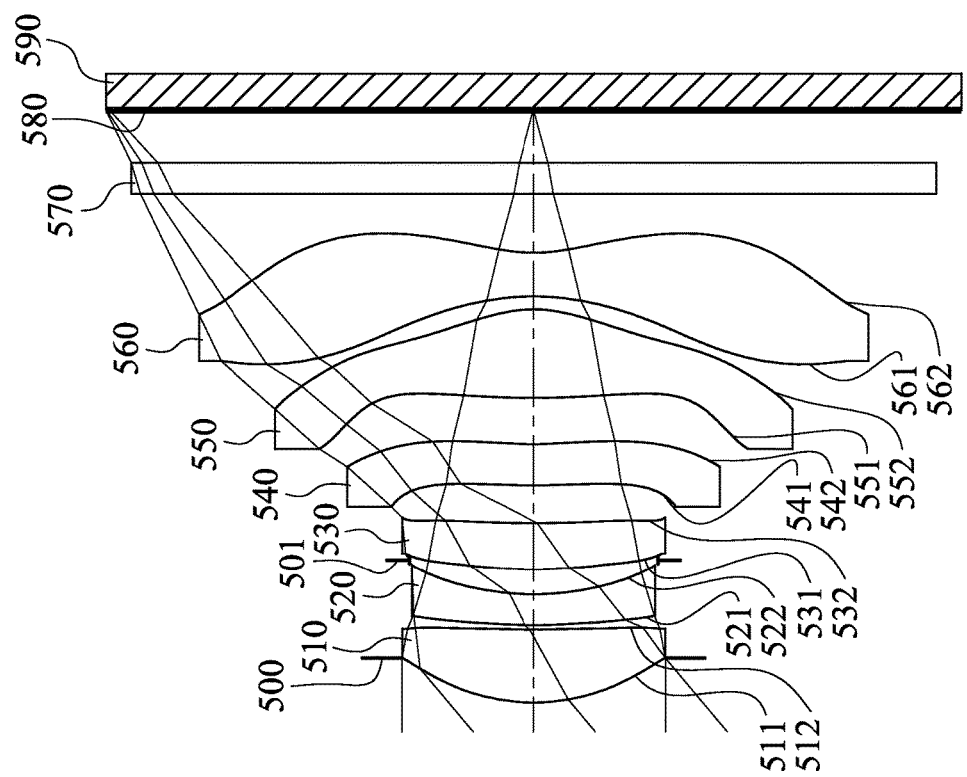
FIG. 9 is a schematic view of an image capturing apparatus according to the 5th embodiment of the present disclosure.
Figure 10:
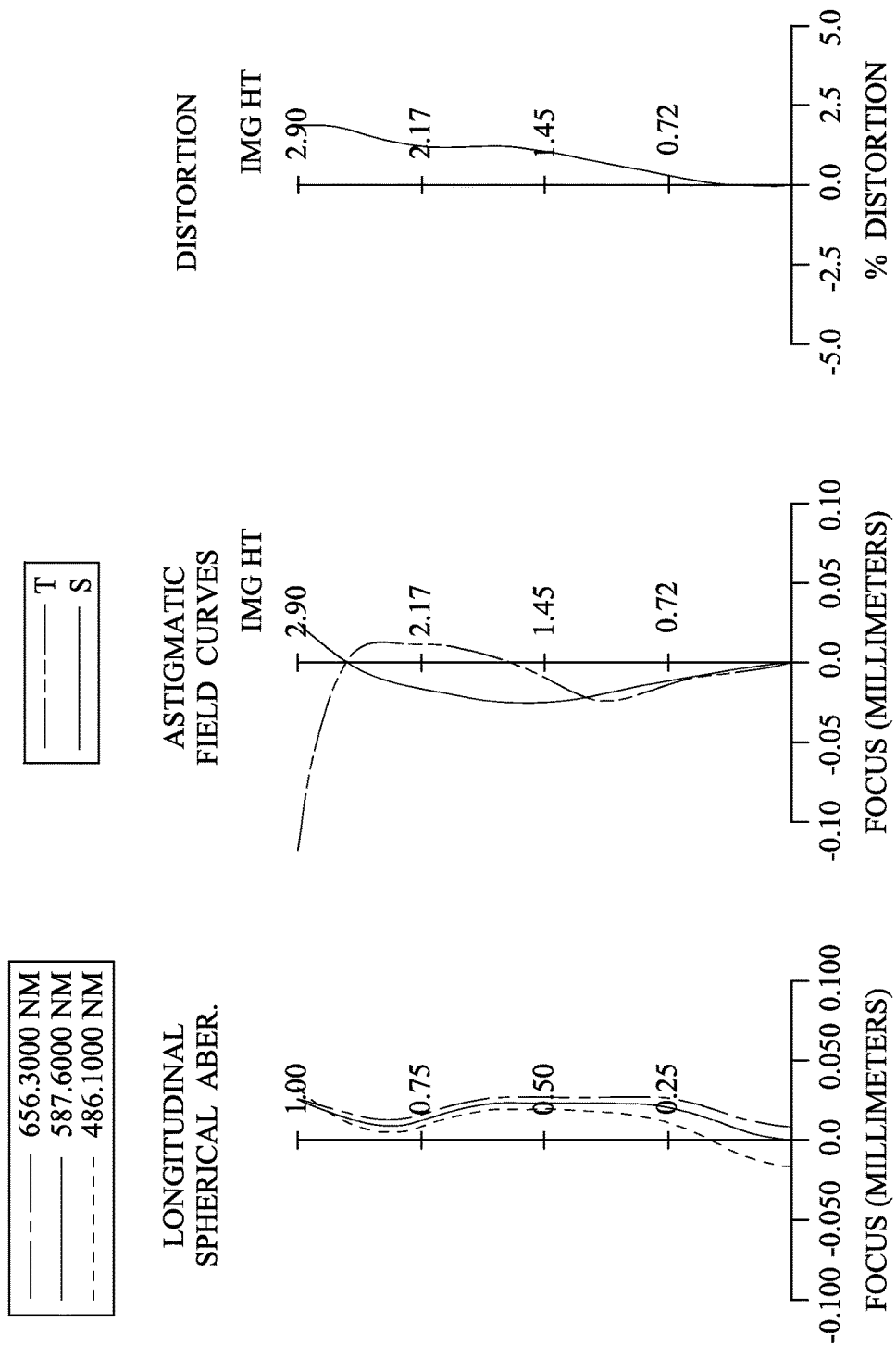
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes the imaging optical system (its reference numeral is omitted) and an image sensor 590. The imaging optical system includes, in order from an object side to an image side, an aperture stop 500, a first lens element 510, a second lens element 520, a stop 501, a third lens element 530, a fourth lens element 540, a fifth lens element 550, a sixth lens element 560, an IR-cut filter 570 and an image surface 580. The image sensor 590 is disposed on the image surface 580 of the imaging optical system. The imaging optical system has a total of six lens elements (510-560). Moreover, there is an air gap on the optical axis between every two of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, each of the object-side surface 541 and the image-side surface 542 of the fourth lens element 540 has at least one inflection point in an off-axial region thereon. The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 is made of a glass material and located between the sixth lens element 560 and the image surface 580, and will not affect the focal length of the imaging optical system.

Furthermore, in the imaging optical system of the image capturing apparatus according to the 5th embodiment, when a focal length of the first lens element 510 is f1, a focal length of the third lens element 530 is f3, a focal length of the fourth lens element 540 is f4, a focal length of the fifth lens element 550 is f5, and a focal length of the sixth lens element 560 is f6, both |f3| and |f4| are greater than |f1|, |f5| and |f6|; |f1| is greater than |f5| and |f6|.

The detailed optical data of the 5th embodiment are shown in TABLE 9 and the aspheric surface data are shown in TABLE 10 below.

TABLE 9

5th Embodiment
f = 3.38 mm, Fno = 1.89, HFOV = 40.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.302 |  |  |  |  |
| 2 | Lens 1 | 1.365 | ASP | 0.494 | Plastic | 1.544 | 55.9 | 3.28 |
| 3 |  | 5.047 | ASP | 0.030 |  |  |  |  |
| 4 | Lens 2 | 2.822 | ASP | 0.210 | Plastic | 1.639 | 23.5 | −6.92 |
| 5 |  | 1.673 | ASP | 0.234 |  |  |  |  |
| 6 | Stop | Plano |  | −0.063 |  |  |  |  |
| 7 | Lens 3 | 3.327 | ASP | 0.315 | Plastic | 1.544 | 55.9 | 12.99 |
| 8 |  | 6.073 | ASP | 0.256 |  |  |  |  |
| 9 | Lens 4 | 4.030 | ASP | 0.280 | Plastic | 1.639 | 23.5 | −19.38 |
| 10 |  | 2.958 | ASP | 0.313 |  |  |  |  |
| 11 | Lens 5 | 4.981 | ASP | 0.602 | Plastic | 1.544 | 55.9 | 1.38 |
| 12 |  | −0.848 | ASP | 0.087 |  |  |  |  |
| 13 | Lens 6 | −1.631 | ASP | 0.300 | Plastic | 1.544 | 55.9 | −1.17 |
| 14 |  | 1.104 | ASP | 0.400 |  |  |  |  |
| 15 | IR-cut filter | Plano |  | 0.210 | Glass | 1.517 | 64.2 | — |
| 16 |  | Plano |  | 0.356 |  |  |  |  |
| 17 | Image | Plano |  | — |  |  |  |  |

Reference wavelength is 587.6 nm (d-line).
Effective radius of Surface 6 is 0.845 mm.

TABLE 10

| Aspheric Coefficients | | | | | | |
|---|---|---|---|---|---|---|
| Surface # | 2 | 3 | 4 | 5 | 7 | 8 |
| k = | −9.7065E+00 | −3.6219E+01 | −7.4297E+00 | −6.7159E+00 | −3.6217E+01 | 9.9616E+00 |
| A4 = | 4.4365E−01 | −5.9759E−01 | −7.8525E−01 | −1.6727E−01 | 2.4302E−02 | −1.9589E−01 |
| A6 = | −7.4984E−01 | 2.8091E+00 | 3.6484E+00 | 1.1497E+00 | −3.2089E−01 | 6.9610E−01 |
| A8 = | 1.3235E+00 | −7.3371E+00 | −9.6355E+00 | −2.8345E+00 | 1.9066E+00 | −2.3936E+00 |
| A10 = | −1.7898E+00 | 1.1135E+01 | 1.5301E+01 | 3.9327E+00 | −5.8389E+00 | 4.7377E+00 |
| A12 = | 1.5000E+00 | −9.2266E+00 | −1.3192E+01 | −2.1550E+00 | 8.2284E+00 | −5.3821E+00 |
| A14 = | −6.1242E−01 | 3.1107E+00 | 4.6300E+00 | 2.8459E−02 | −4.0011E+00 | 2.7490E+00 |
| Surface # | 9 | 10 | 11 | 12 | 13 | 14 |
| k = | 8.5263E+00 | −5.7501E+01 | −3.4942E+00 | −6.2664E+00 | −2.1132E+01 | −1.1357E+01 |
| A4 = | −4.4669E−01 | −2.0526E−01 | −1.3677E−01 | 3.6247E−02 | −2.2606E−01 | −1.6036E−01 |
| A6 = | 6.7274E−01 | 1.1234E−01 | 2.9691E−01 | 8.2957E−02 | 1.8307E−01 | 1.1470E−01 |
| A8 = | −1.0390E+00 | 1.6440E−02 | −6.1498E−01 | −7.8669E−02 | −6.8512E−02 | −6.1987E−02 |
| A10 = | 9.6368E−01 | −1.1925E−01 | 6.7701E−01 | −4.5326E−03 | 1.5253E−02 | 2.0595E−02 |
| A12 = | −6.0424E−01 | 9.0525E−02 | −4.6067E−01 | 2.1472E−02 | −2.1561E−03 | −4.1691E−03 |
| A14 = | 1.0318E−01 | −2.1976E−02 | 1.6705E−01 | −7.0890E−03 | 1.9077E−04 | 4.7860E−04 |
| A16 = | | | −2.3683E−02 | 7.1848E−04 | −8.4505E−06 | −2.3547E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 3.38 | (|R6| + |R8|)/f | 2.67 |
| Fno | 1.89 | (R9 + R10)/(R9 − R10) | 0.71 |
| HFOV (deg.) | 40.0 | f/R6 | 0.56 |
| V3/V4 | 2.38 | |f/f3| + |f/f4| | 0.43 |
| CT4/CT3 | 0.89 | |f1| | 3.28 |
| CT5/(CT3 + CT4) | 1.01 | |f3| | 12.99 |
| CT4/T34 | 1.09 | |f4| | 19.38 |
| ImgH/EPD | 1.62 | |f5| | 1.38 |
| Td/ImgH | 1.06 | |f6| | 1.17 |

6th Embodiment

Figure 11:
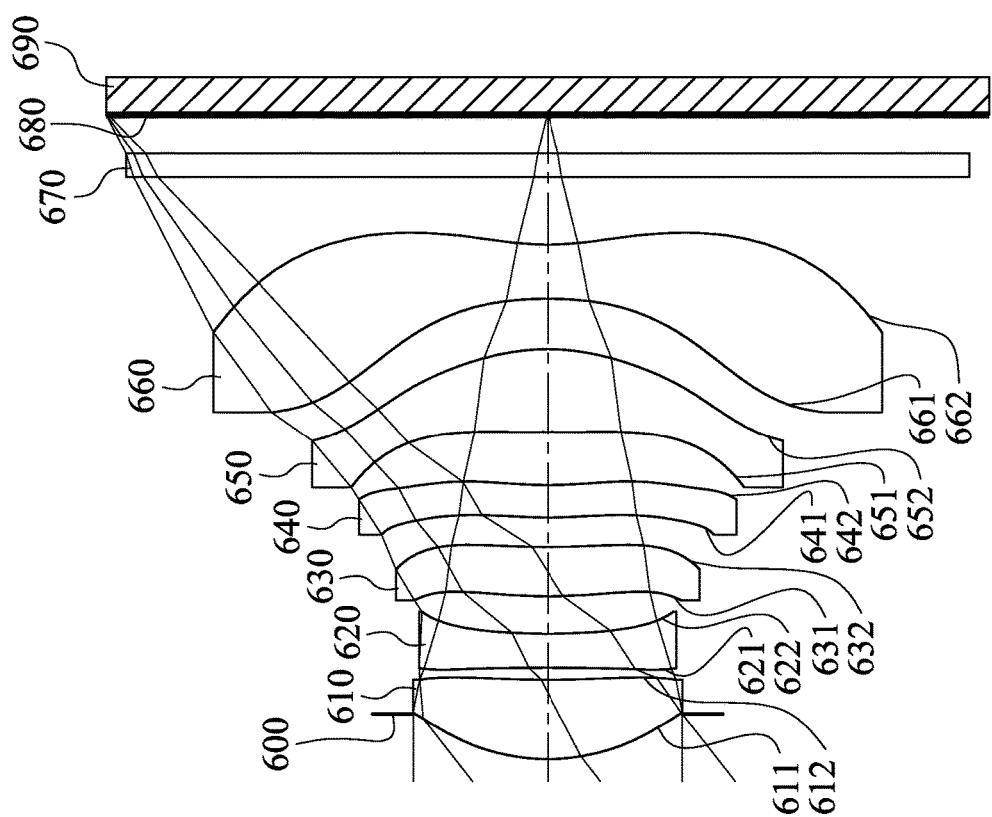
FIG. 11 is a schematic view of an image capturing apparatus according to the 6th embodiment of the present disclosure.
Figure 12:
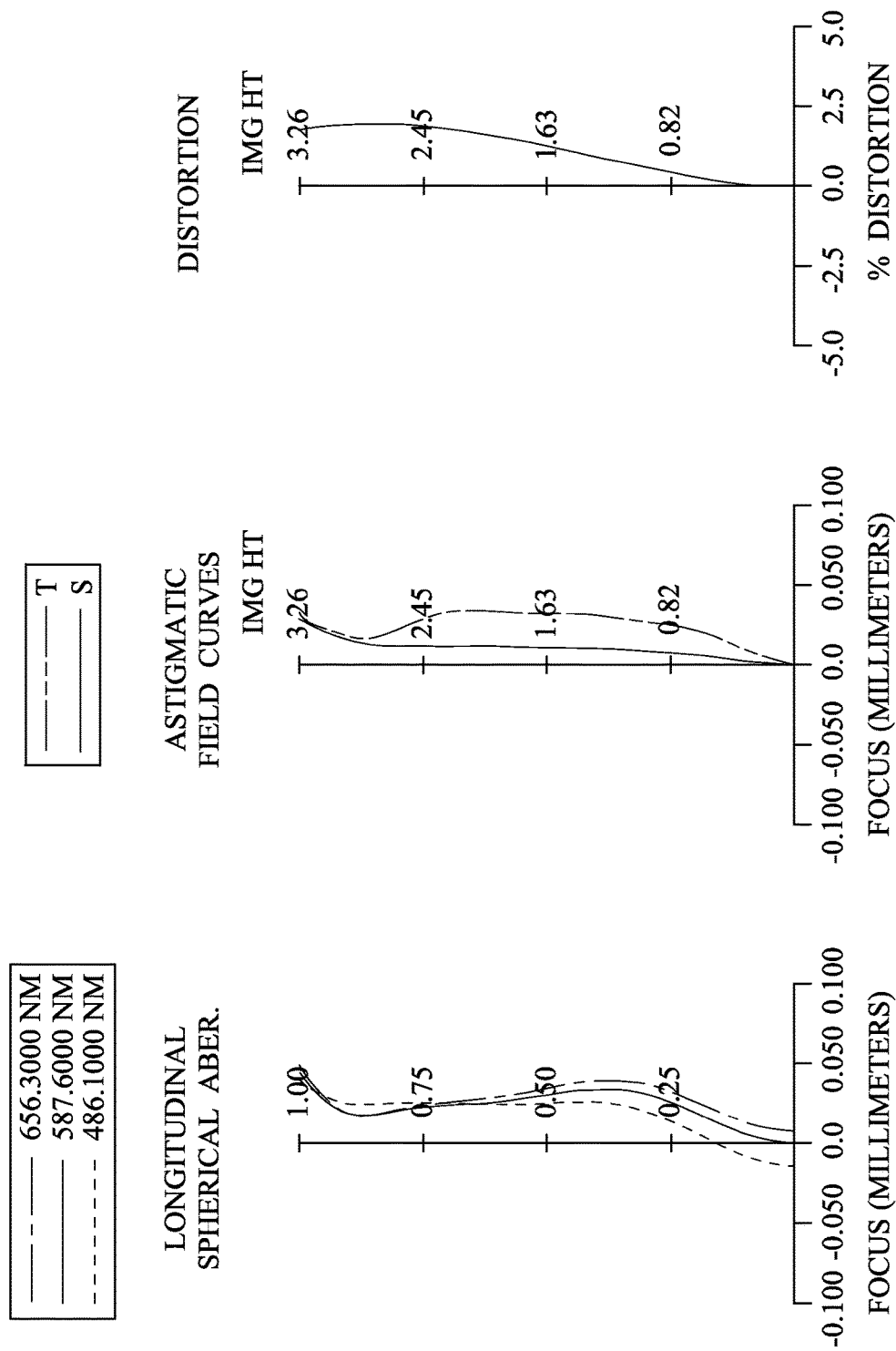
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment. In FIG. 11, the image capturing apparatus includes the imaging optical system (its reference numeral is omitted) and an image sensor 690. The imaging optical system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680. The image sensor 690 is disposed on the image surface 680 of the imaging optical system. The imaging optical system has a total of six lens elements (610-660). Moreover, there is an air gap on the optical axis between every two of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, each of the object-side surface 641 and the image-side surface 642 of the fourth lens element 640 has at least one inflection point in an off-axial region thereon.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axial region thereof.

The IR-cut filter 670 is made of a glass material and located between the sixth lens element 660 and the image surface 680, and will not affect the focal length of the imaging optical system.

Furthermore, in the imaging optical system of the image capturing apparatus according to the 6th embodiment, when a focal length of the first lens element 610 is f1, a focal length of the third lens element 630 is f3, a focal length of the fourth lens element 640 is f4, a focal length of the fifth lens element 650 is f5, and a focal length of the sixth lens element 660 is f6, both |f3| and |f4| are greater than |f1|, |f5| and |f6|; |f1| is greater than |f5| and |f6|.

The detailed optical data of the 6th embodiment are shown in TABLE 11 and the aspheric surface data are shown in TABLE 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 4.08 | (|R6| + |R8|)/f | 2.18 |
| Fno | 2.05 | (R9 + R10)/(R9 − R10) | 0.99 |

TABLE 11

6th Embodiment
f = 4.08 mm, Fno = 2.05, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.336 | | | | |
| 2 | Lens 1 | 1.519 | ASP | 0.591 | Plastic | 1.544 | 55.9 | 3.41 |
| 3 | | 7.267 | ASP | 0.088 | | | | |
| 4 | Lens 2 | −68.180 | ASP | 0.250 | Plastic | 1.640 | 23.3 | −6.25 |
| 5 | | 4.254 | ASP | 0.278 | | | | |
| 6 | Lens 3 | 3.858 | ASP | 0.364 | Plastic | 1.544 | 55.9 | 19.43 |
| 7 | | 5.872 | ASP | 0.218 | | | | |
| 8 | Lens 4 | 3.391 | ASP | 0.240 | Plastic | 1.640 | 23.3 | −59.79 |
| 9 | | 3.029 | ASP | 0.396 | | | | |
| 10 | Lens 5 | 222.798 | ASP | 0.612 | Plastic | 1.544 | 55.9 | 2.81 |
| 11 | | −1.541 | ASP | 0.371 | | | | |
| 12 | Lens 6 | −3.084 | ASP | 0.400 | Plastic | 1.535 | 55.7 | −2.15 |
| 13 | | 1.916 | ASP | 0.500 | | | | |
| 14 | IR-cut filter | Plano | | 0.175 | Glass | 1.517 | 64.2 | — |
| 15 | | Plano | | 0.287 | | | | |
| 16 | Image | Plano | | — | | | | |

Reference wavelength is 587.6 nm (d-line).
Effective radius of Surface 4 is 0.950 mm.

TABLE 12

| Aspheric Coefficients | | | | | | |
|---|---|---|---|---|---|---|
| Surface # | 2 | 3 | 4 | 5 | 6 | 7 |
| k = | 1.5188E−01 | −6.3393E+01 | −9.0000E+01 | −3.3925E+01 | −6.9700E+01 | −4.5581E+01 |
| A4 = | −9.6679E−03 | −6.4892E−02 | −1.1768E−01 | 2.1468E−03 | 2.4634E−02 | −1.2820E−01 |
| A6 = | 1.6873E−02 | 7.8329E−03 | 2.2029E−01 | 1.4448E−01 | −1.5553E−01 | 1.5210E−01 |
| A8 = | −4.7831E−02 | 6.7093E−02 | −1.5012E−01 | −2.5858E−02 | −8.7425E−03 | −2.7536E−01 |
| A10 = | 2.5111E−02 | −1.6511E−01 | 2.5480E−02 | −1.0425E−01 | 1.5148E−01 | 1.1466E−01 |
| A12 = | 1.2836E−02 | 1.2721E−01 | 5.1443E−02 | 1.5274E−01 | −2.6435E−01 | 1.8983E−02 |
| A14 = | −3.3418E−02 | −3.8886E−02 | −1.2000E−02 | −2.1958E−02 | 1.3853E−01 | −1.8630E−02 |
| Surface # | 8 | 9 | 10 | 11 | 12 | 13 |
| k = | −3.3429E+01 | −6.5828E+00 | −1.0602E+00 | −9.5563E+00 | −3.5361E+01 | −1.6052E+01 |
| A4 = | −2.5570E−01 | −2.9537E−01 | −3.6923E−03 | −1.3913E−01 | −3.1500E−01 | −1.1497E−01 |
| A6 = | 1.6329E−01 | 1.5995E−01 | −1.3436E−01 | 1.5681E−01 | 2.4774E−01 | 6.3847E−02 |
| A8 = | 5.0571E−02 | 5.4378E−02 | 1.1893E−01 | −1.7412E−01 | −1.5056E−01 | −2.5398E−02 |
| A10 = | −1.9794E−01 | −1.9873E−01 | −9.7620E−02 | 1.0823E−01 | 6.4983E−02 | 6.2878E−03 |
| A12 = | 1.3870E−01 | 2.0274E−01 | 6.3441E−02 | −3.4356E−02 | −1.6373E−02 | −9.3580E−04 |
| A14 = | −1.6228E−02 | −9.3972E−02 | −2.3262E−02 | 5.4822E−03 | 2.1403E−03 | 7.4940E−05 |
| A16 = | −1.1271E−02 | 1.5854E−02 | 3.3566E−03 | −3.5998E−04 | −1.1269E−04 | −2.4296E−06 |

-continued

6th Embodiment

| | | | |
|---|---|---|---|
| HFOV (deg.) | 38.0 | f/R6 | 0.69 |
| V3/V4 | 2.40 | \|f/f3\| + \|f/f4\| | 0.28 |
| CT4/CT3 | 0.66 | \|f1\| | 3.41 |
| CT5/(CT3 + CT4) | 1.01 | \|f3\| | 19.43 |
| CT4/T34 | 1.10 | \|f4\| | 59.79 |
| ImgH/EPD | 1.64 | \|f5\| | 2.81 |
| Td/ImgH | 1.17 | \|f6\| | 2.15 |

7th Embodiment

Figure 13:
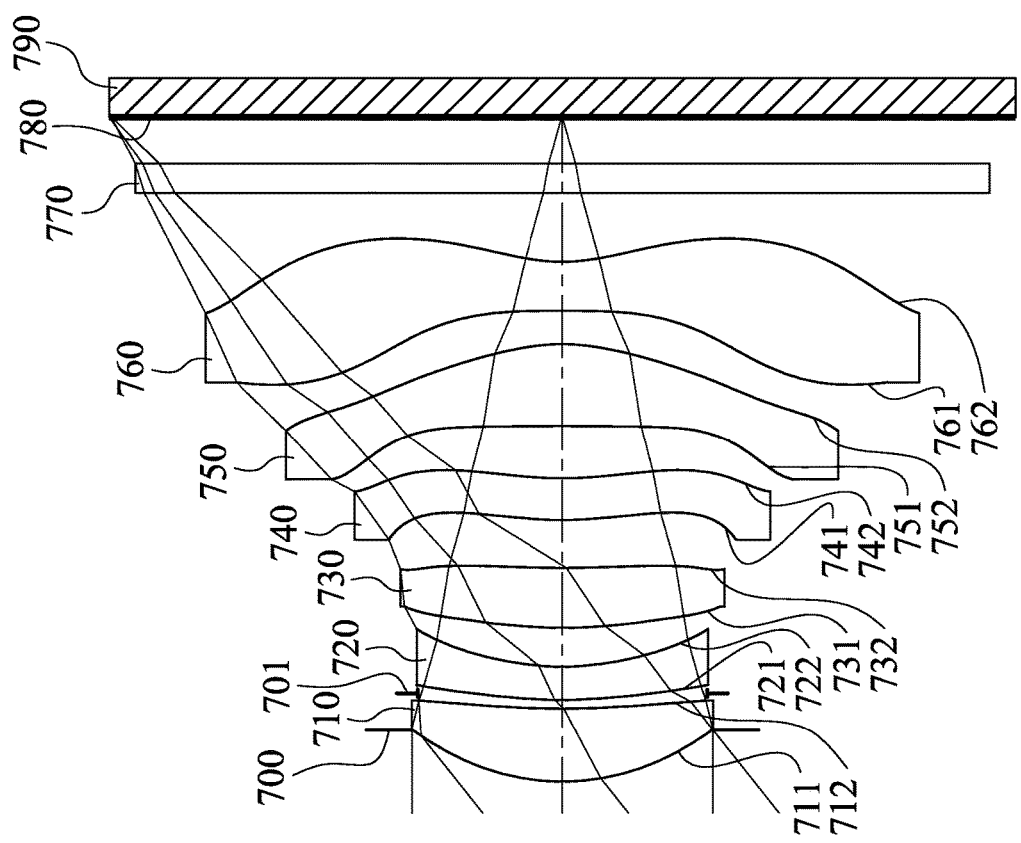
FIG. 13 is a schematic view of an image capturing apparatus according to the 7th embodiment of the present disclosure.
Figure 14:
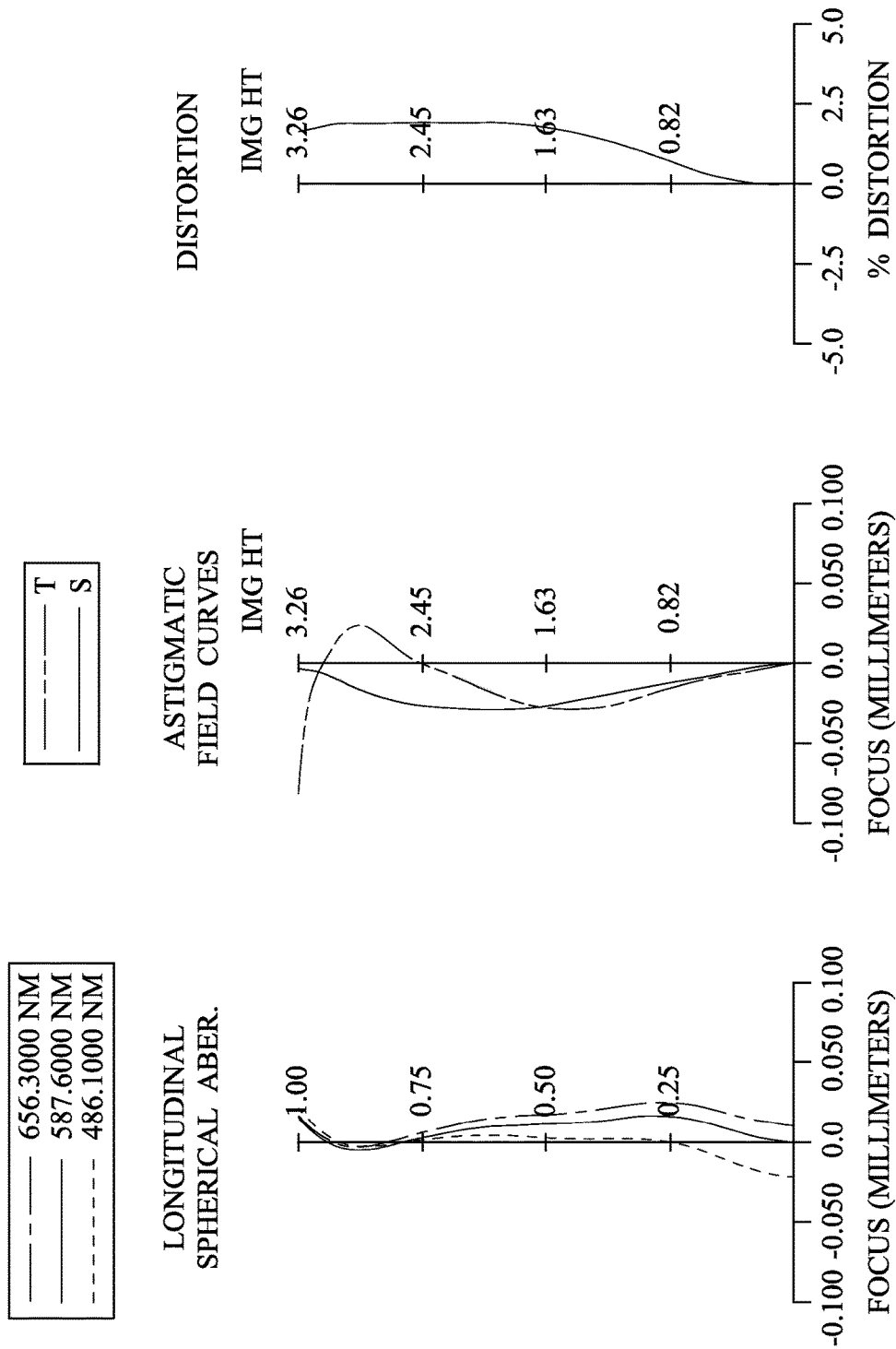
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment. In FIG. 13, the image capturing apparatus includes the imaging optical system (its reference numeral is omitted) and an image sensor 790. The imaging optical system includes, in order from an object side to an image side, an aperture stop 700, a first lens element 710, a stop 701, a second lens element 720, a third lens element 730, a fourth lens element 740, a fifth lens element 750, a sixth lens element 760, an IR-cut filter 770 and an image surface 780. The image sensor 790 is disposed on the image surface 780 of the imaging optical system. The imaging optical system has a total of six lens elements (710-760). Moreover, there is an air gap on the optical axis between every two of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, each of the object-side surface 741 and the image-side surface 742 of the fourth lens element 740 has at least one inflection point in an off-axial region thereon. The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being concave in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof.

The IR-cut filter 770 is made of a glass material and located between the sixth lens element 760 and the image surface 780, and will not affect the focal length of the imaging optical system.

Furthermore, in the imaging optical system of the image capturing apparatus according to the 7th embodiment, when a focal length of the first lens element 710 is f1, a focal length of the third lens element 730 is f3, a focal length of the fourth lens element 740 is f4, a focal length of the fifth lens element 750 is f5, and a focal length of the sixth lens element 760 is f6, both |f3| and |f4| are greater than |f1|, |f5| and |f6|; |f1| is greater than |f5| and |f6|.

The detailed optical data of the 7th embodiment are shown in TABLE 13 and the aspheric surface data are shown in TABLE 14 below.

TABLE 13

7th Embodiment
f = 4.03 mm, Fno = 1.86, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.373 | | | | |
| 2 | Lens 1 | 1.696 | ASP | 0.528 | Plastic | 1.544 | 55.9 | 4.34 |
| 3 | | 5.358 | ASP | 0.110 | | | | |
| 4 | Stop | Plano | | −0.048 | | | | |
| 5 | Lens 2 | 3.050 | ASP | 0.240 | Plastic | 1.660 | 20.4 | −8.73 |
| 6 | | 1.932 | ASP | 0.280 | | | | |
| 7 | Lens 3 | 3.720 | ASP | 0.430 | Plastic | 1.544 | 55.9 | 12.96 |
| 8 | | 7.551 | ASP | 0.345 | | | | |
| 9 | Lens 4 | 2.804 | ASP | 0.300 | Plastic | 1.639 | 23.5 | 101.68 |
| 10 | | 2.808 | ASP | 0.378 | | | | |
| 11 | Lens 5 | −25.340 | ASP | 0.591 | Plastic | 1.544 | 55.9 | 2.73 |
| 12 | | −1.415 | ASP | 0.240 | | | | |

TABLE 13-continued

7th Embodiment
f = 4.03 mm, Fno = 1.86, HFOV = 38.5 deg.

| Surface # | | Curvature Radius | | Thickness | Material | Index | Abbe # | Focal Length |
|---|---|---|---|---|---|---|---|---|
| 13 | Lens 6 | −12.111 | ASP | 0.351 | Plastic | 1.544 | 55.9 | −2.10 |
| 14 | | 1.273 | ASP | 0.495 | | | | |
| 15 | IR-cut filter | Plano | | 0.210 | Glass | 1.517 | 64.2 | — |
| 16 | | Plano | | 0.340 | | | | |
| 17 | Image | Plano | | — | | | | |

Reference wavelength is 587.6 nm (d-line).
Effective radius of Surface 4 is 1.040 mm.

TABLE 14

Aspheric Coefficients

| Surface # | 2 | 3 | 5 | 6 | 7 | 8 |
|---|---|---|---|---|---|---|
| k = | −8.7838E+00 | −5.9598E+01 | −3.8634E+01 | −1.6551E+00 | −4.2273E+01 | −3.4517E+01 |
| A4 = | 2.1398E−01 | −8.5799E−02 | −7.1594E−02 | −1.1325E−01 | 7.2736E−02 | −8.8170E−02 |
| A6 = | −2.0841E−01 | 2.9063E−01 | 2.5573E−01 | 2.5455E−01 | −2.0494E−01 | 1.3200E−01 |
| A8 = | 2.3213E−01 | −4.9417E−01 | −4.6070E−01 | −3.3853E−01 | 4.5145E−01 | −2.5563E−01 |
| A10 = | −1.9545E−01 | 4.3626E−01 | 4.2593E−01 | 2.4411E−01 | −6.4439E−01 | 2.8594E−01 |
| A12 = | 9.8339E−02 | −1.8745E−01 | −1.6539E−01 | −1.8819E−02 | 4.6365E−01 | −1.9992E−01 |
| A14 = | −2.2673E−02 | 2.8855E−02 | 1.5121E−02 | −3.4470E−02 | −1.2136E−01 | 6.4640E−02 |

| Surface # | 9 | 10 | 11 | 12 | 13 | 14 |
|---|---|---|---|---|---|---|
| k = | −2.6581E+01 | −2.3885E+01 | −5.3118E+01 | −6.2919E+00 | 3.9722E−01 | −7.7371E+00 |
| A4 = | −4.7039E−02 | −2.9111E−02 | 5.2663E−02 | 6.9981E−02 | −1.2946E−01 | −1.2055E−01 |
| A6 = | −8.9487E−02 | −1.1282E−01 | −9.1041E−02 | −9.1373E−02 | −1.5790E−02 | 5.5911E−02 |
| A8 = | 1.3536E−01 | 1.4181E−01 | 1.7439E−03 | 3.4697E−02 | 5.0207E−02 | −1.8842E−02 |
| A10 = | −1.2127E−01 | −9.8809E−02 | 3.7025E−02 | 2.0574E−03 | −2.0182E−02 | 4.2012E−03 |
| A12 = | 4.6343E−02 | 3.3764E−02 | −2.9705E−02 | −4.2188E−03 | 3.7408E−03 | −6.0856E−04 |
| A14 = | −8.7550E−03 | −4.0911E−03 | 1.0402E−02 | 9.5847E−04 | −3.4254E−04 | 5.1923E−05 |
| A16 = | | −1.3109E−03 | | −7.1380E−05 | 1.2533E−05 | −1.9160E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 4.03 | (|R6| + |R8|)/f | 2.57 |
| Fno | 1.86 | (R9 + R10)/(R9 − R10) | 1.12 |
| HFOV (deg.) | 38.5 | f/R6 | 0.53 |
| V3/V4 | 2.38 | |f/f3| + |f/f4| | 0.35 |
| CT4/CT3 | 0.70 | |f1| | 4.34 |
| CT5/(CT3 + CT4) | 0.81 | |f3| | 12.96 |
| CT4/T34 | 0.87 | |f4| | 101.68 |
| ImgH/EPD | 1.51 | |f5| | 2.73 |
| Td/ImgH | 1.15 | |f6| | 2.10 |

8th Embodiment

Figure 15:
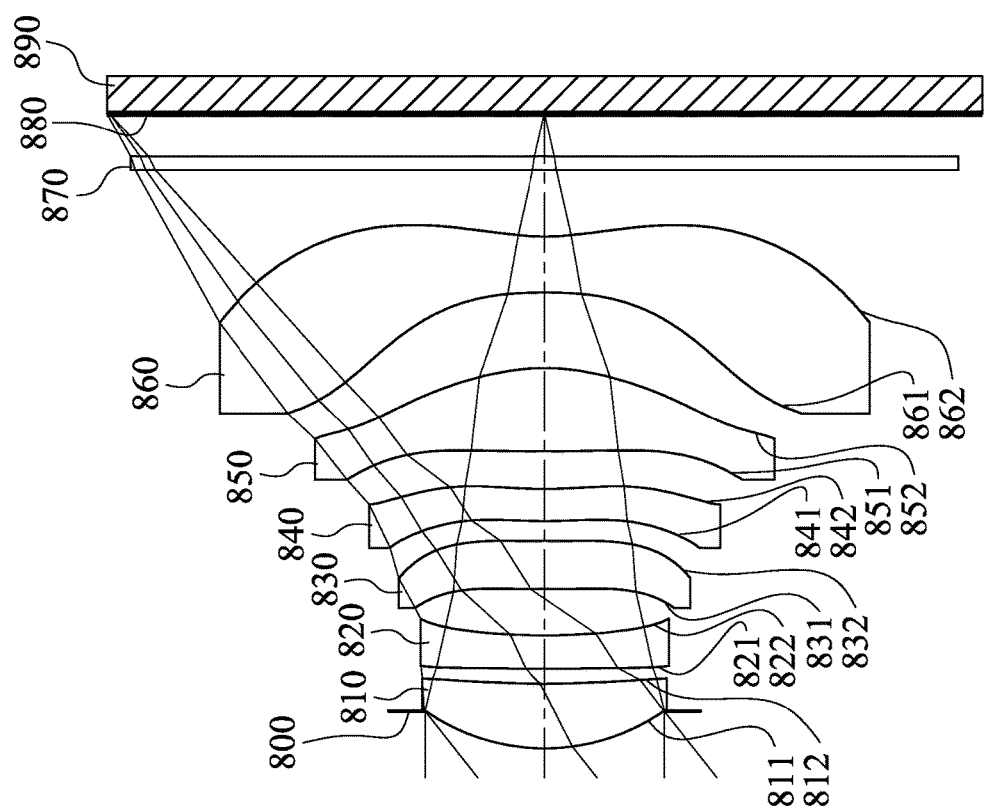
FIG. 15 is a schematic view of an image capturing apparatus according to the 8th embodiment of the present disclosure.
Figure 16:
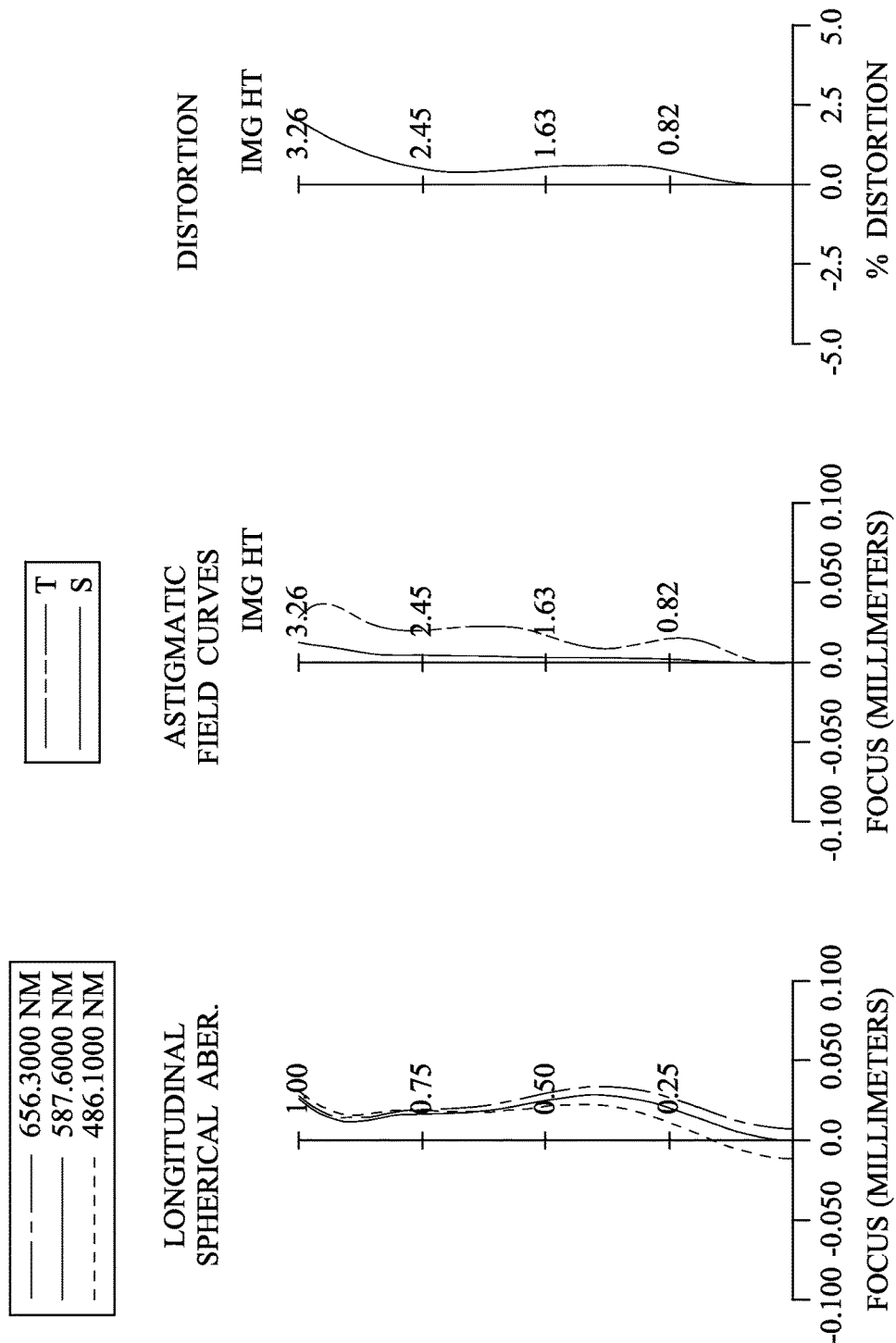
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows, in order from left to right, spherical aberration curves, astigmatic field curves and a distortion curve of the image capturing apparatus according to the 8th embodiment. In FIG. 15, the image capturing apparatus includes the imaging optical system (its reference numeral is omitted) and an image sensor 890. The imaging optical system includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880. The image sensor 890 is disposed on the image surface 880 of the imaging optical system. The imaging optical system has a total of six lens elements (810-860). Moreover, there is an air gap on the optical axis between every two of the first lens element 810, the second lens element 820, the third lens element 830, the fourth lens element 840, the fifth lens element 850 and the sixth lens element 860 that are adjacent to each other.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, each of the object-side surface 841 and the image-side surface 842 of the fourth lens element 840 has at least one inflection point in an off-axial region thereon.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being concave in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex shape in an off-axial region thereof.

The IR-cut filter 870 is made of a glass material and located between the sixth lens element 860 and the image surface 880, and will not affect the focal length of the imaging optical system.

Furthermore, in the imaging optical system of the image capturing apparatus according to the 8th embodiment, when a focal length of the first lens element 810 is f1, a focal length of the third lens element 830 is f3, a focal length of the fourth lens element 840 is f4, a focal length of the fifth lens element 850 is f5, and a focal length of the sixth lens element 860 is f6, both |f3| and |f4| are greater than |f1|, |f5| and |f6|; |f1| is greater than |f5| and |f6|.

The detailed optical data of the 8th embodiment are shown in TABLE 15 and the aspheric surface data are shown in TABLE 16 below.

TABLE 15

8th Embodiment
f = 4.04 mm, Fno = 2.25, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.280 | | | | |
| 2 | Lens 1 | 1.578 | ASP | 0.489 | Glass | 1.542 | 62.9 | 3.66 |
| 3 | | 6.880 | ASP | 0.112 | | | | |
| 4 | Lens 2 | 13.909 | ASP | 0.250 | Plastic | 1.661 | 20.4 | −10.12 |
| 5 | | 4.484 | ASP | 0.350 | | | | |
| 6 | Lens 3 | 20.087 | ASP | 0.358 | Plastic | 1.544 | 55.9 | −122.32 |
| 7 | | 15.334 | ASP | 0.150 | | | | |
| 8 | Lens 4 | 4.011 | ASP | 0.240 | Plastic | 1.614 | 25.6 | −22.45 |
| 9 | | 3.037 | ASP | 0.281 | | | | |
| 10 | Lens 5 | 11.483 | ASP | 0.630 | Plastic | 1.544 | 55.9 | 2.81 |
| 11 | | −1.732 | ASP | 0.567 | | | | |
| 12 | Lens 6 | −3.945 | ASP | 0.419 | Plastic | 1.544 | 55.9 | −2.32 |
| 13 | | 1.932 | ASP | 0.500 | | | | |
| 14 | IR-cut filter | Plano | | 0.100 | Glass | 1.517 | 64.2 | — |
| 15 | | Plano | | 0.324 | | | | |
| 16 | Image | Plano | | — | | | | |

Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | 7.8326E−01 | 7.4092E+00 | 5.6895E+01 | −7.6502E+00 | 2.5727E+01 | −1.0000E+00 |
| A4 = | −2.7778E−02 | −5.3558E−02 | −1.0330E−01 | −4.6276E−02 | −1.3181E−01 | −2.4199E−01 |
| A6 = | 2.5223E−02 | 1.5922E−02 | 1.4779E−01 | 1.0589E−01 | 5.1845E−03 | 1.7466E−01 |
| A8 = | −7.9169E−02 | 8.8256E−02 | −5.1003E−02 | 3.9333E−02 | −1.6873E−01 | −2.5648E−01 |
| A10 = | 4.9813E−02 | −1.7085E−01 | −3.6139E−02 | −1.5926E−01 | 2.3176E−01 | 1.0743E−01 |
| A12 = | 1.2865E−02 | 1.2721E−01 | 5.1443E−02 | 1.5274E−01 | −2.6435E−01 | 1.8951E−02 |
| A14 = | −3.3418E−02 | −3.8886E−02 | −1.2000E−02 | −2.1958E−02 | 1.3853E−01 | −1.8630E−02 |

| Surface # | 8 | 9 | 10 | 11 | 12 | 13 |
|---|---|---|---|---|---|---|
| k = | −5.0000E+01 | −6.5964E+00 | −1.0602E+00 | −7.9685E+00 | −2.8354E+01 | −1.5419E+01 |
| A4 = | −3.5609E−01 | −3.5353E−01 | −3.9897E−02 | −1.1091E−01 | −3.1990E−01 | −1.1843E−01 |
| A6 = | 2.2333E−01 | 2.3226E−01 | −1.2193E−02 | 1.5515E−01 | 2.5656E−01 | 6.3151E−02 |
| A8 = | 2.9746E−02 | −7.9415E−02 | −8.0425E−02 | −1.7092E−01 | −1.6671E−01 | −2.5840E−02 |
| A10 = | −1.9802E−01 | 2.8174E−02 | 1.3956E−01 | 1.0784E−01 | 7.3115E−02 | 6.7370E−03 |
| A12 = | 1.3873E−01 | −2.0003E−02 | −9.6827E−02 | −3.4676E−02 | −1.7951E−02 | −1.0509E−03 |
| A14 = | −1.6209E−02 | 7.9617E−03 | 3.1311E−02 | 5.3829E−03 | 2.2350E−03 | 8.7983E−05 |
| A16 = | −1.1271E−02 | −6.6030E−04 | −3.8706E−03 | −3.2447E−04 | −1.1076E−04 | −3.0117E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 4.04 | (|R6| + |R8|)/f | 4.55 |
| Fno | 2.25 | (R9 + R10)/(R9 − R10) | 0.74 |
| HFOV (deg.) | 38.2 | f/R6 | 0.26 |
| V3/V4 | 2.18 | |f/f3| + |f/f4| | 0.21 |
| CT4/CT3 | 0.67 | |f1| | 3.66 |
| CT5/(CT3 + CT4) | 1.05 | |f3| | 122.32 |
| CT4/T34 | 1.60 | |f4| | 22.45 |
| ImgH/EPD | 1.82 | |f5| | 2.81 |
| Td/ImgH | 1.18 | |f6| | 2.32 |

9th Embodiment

Figure 17:
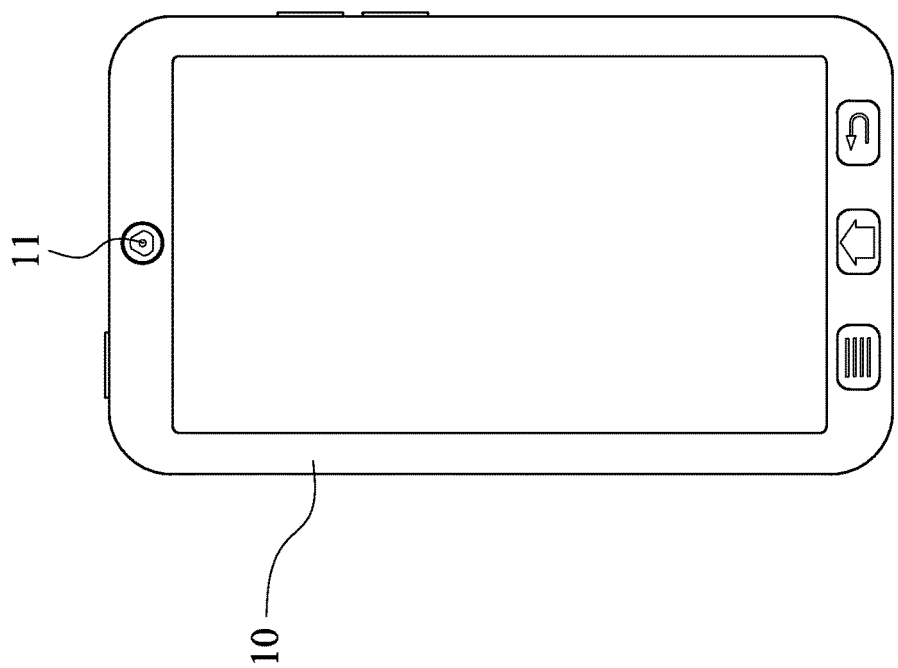
FIG. 17 shows an electronic device according to the 9th embodiment of the present disclosure.

FIG. 17 shows an electronic device 10 according to the 9th embodiment of the present disclosure. The electronic device 10 of the 9th embodiment is a smartphone, wherein the electronic device 10 includes an image capturing apparatus 11. The image capturing apparatus 11 includes an imaging optical system (its reference numeral is omitted) according to the present disclosure and an image sensor (its reference numeral is omitted), wherein the image sensor is disposed on an image surface of the imaging optical system.

10th Embodiment

Figure 18:
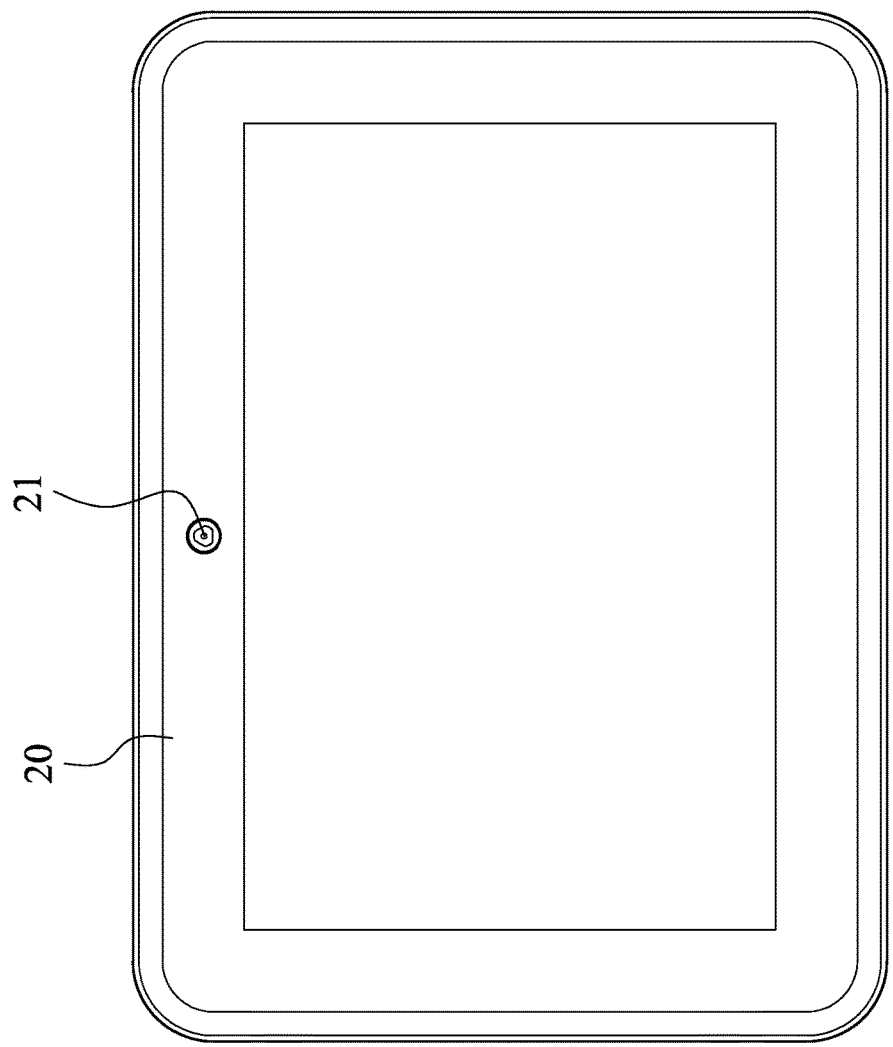
FIG. 18 shows an electronic device according to the 10th embodiment of the present disclosure.

FIG. 18 shows an electronic device 20 according to the 10th embodiment of the present disclosure. The electronic device 20 of the 10th embodiment is a tablet personal computer, wherein the electronic device 20 includes an image capturing apparatus 21. The image capturing apparatus 21 includes an imaging optical system (its reference numeral is omitted) according to the present disclosure and an image sensor (its reference numeral is omitted), wherein the image sensor is disposed on an image surface of the imaging optical system.

11th Embodiment

Figure 19:
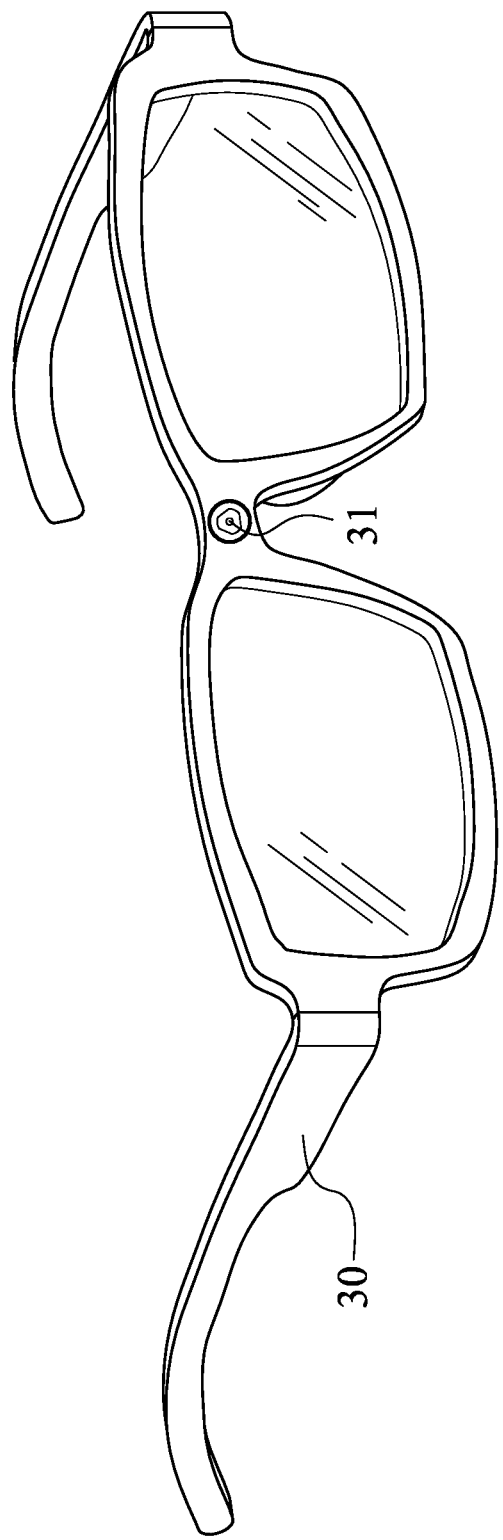
FIG. 19 shows an electronic device according to the 11th embodiment of the present disclosure.

FIG. 19 shows an electronic device 30 according to the 11th embodiment of the present disclosure. The electronic device 30 of the 11th embodiment is a wearable device, wherein the electronic device 30 includes an image capturing apparatus 31. The image capturing apparatus 31 includes an imaging optical system (its reference numeral is omitted) according to the present disclosure and an image sensor (its reference numeral is omitted), wherein the image sensor is disposed on an image surface of the imaging optical system.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system comprising, in order from an object side to an image side:
   a first lens element with positive refractive power having an object-side surface being convex in a paraxial region thereof;
   a second lens element having an object-side surface being convex in a paraxial region thereof;
   a third lens element having an image-side surface being concave in a paraxial region thereof;
   a fourth lens element having an image-side surface being concave in a paraxial region thereof;
   a fifth lens element having positive refractive power; and
   a sixth lens element with negative refractive power having an image-side surface being concave in a paraxial region thereof, wherein an object-side surface and the image-side surface of the sixth lens element are aspheric, and the image-side surface of the sixth lens element comprises at least one convex shape in an off-axial region thereof;
   wherein the imaging optical system has a total of six lens elements, there is an air gap between every two of the first lens element, the second lens element, the third lens element, the fourth lens element, the fifth lens element and the sixth lens element that are adjacent to each other;
   wherein a focal length of the first lens element is f1, a focal length of the third lens element is f3, a focal length of the fourth lens element is f4, a focal length of the fifth lens element is f5, a focal length of the sixth lens element is f6, and both |f3| and |f4| are greater than |f1|, |f5| and |f6|;
   wherein an axial distance between the object-side surface of the first lens element and the image-side surface of the sixth lens element is Td, a maximum image height of the imaging optical system is ImgH, an Abbe number of the third lens element is V3, an Abbe number of the fourth lens element is V4, a curvature radius of the image-side surface of the third lens element is R6, a curvature radius of the image-side surface of the fourth lens element is R8, a focal length of the imaging optical system is f, an entrance pupil diameter of the imaging optical system is EPD, and the following conditions are satisfied:

$Td/ImgH < 1.25$;

$1.5 < V3/V4 < 4.0$;

$(|R6|+|R8|)/f < 5.0$; and $1.25 < ImgH/EPD \le 1.70$.

2. The imaging optical system of claim 1, wherein the axial distance between the object-side surface of the first lens element and the image-side surface of the sixth lens element is Td, the maximum image height of the imaging optical system is ImgH, and the following condition is satisfied:

$Td/ImgH < 1.15$.

3. The imaging optical system of claim 2, wherein the focal length of the imaging optical system is f, the focal length of the third lens element is f3, the focal length of the fourth lens element is f4, and the following condition is satisfied:

$|f/f3|+|f/f4|<0.50.$

4. The imaging optical system of claim 2, wherein the object-side surface of the sixth element is concave in a paraxial region thereof.

5. The imaging optical system of claim 2, wherein the second lens element has negative refractive power.

6. The imaging optical system of claim 1, wherein a central thickness of the third lens element is CT3, a central thickness of the fourth lens element is CT4, a central thickness of the fifth lens element is CT5, and the following condition is satisfied:

$0.80<CT5/(CT3+CT4)<2.0.$

7. The imaging optical system of claim 1, wherein the fourth lens element has an object-side surface being convex in a paraxial region thereof, and each of the object-side surface and the image-side surface of the fourth lens element has at least one inflection point in an off-axial region thereon.

8. The imaging optical system of claim 1, wherein an f-number of the imaging optical system is Fno, and the following condition is satisfied:

$1.5<Fno<2.0.$

9. The imaging optical system of claim 1, wherein a curvature radius of an object-side surface of the fifth lens element is R9, a curvature radius of an image-side surface of the fifth lens element is R10, and the following condition is satisfied:

$0.25<(R9+R10)/(R9-R10)<2.0.$

10. The imaging optical system of claim 1, wherein the focal length of the imaging optical system is f, the curvature radius of the image-side surface of the third lens element is R6, and the following condition is satisfied:

$0.20<f/R6<1.50.$

11. The imaging optical system of claim 10, wherein the focal length of the imaging optical system is f, the curvature radius of the image-side surface of the third lens element is R6, and the following condition is satisfied:

$0.35<f/R6<1.20.$

12. The imaging optical system of claim 10, wherein a central thickness of the third lens element is CT3, a central thickness of the fourth lens element is CT4, and the following condition is satisfied:

$CT4/CT3<1.60.$

13. The imaging optical system of claim 1, wherein a central thickness of the fourth lens element is CT4, an axial distance between the third lens element and the fourth lens element is T34, and the following condition is satisfied:

$0.75<CT4/T34<2.25.$

14. The imaging optical system of claim 1, wherein the focal length of the first lens element is f1, the focal length of the fifth lens element is f5, the focal length of the sixth lens element is f6, and |f1| is greater than |f5| and |f6|.

15. An image capturing apparatus, comprising:
the imaging optical system of claim 1; and
an image sensor, wherein the image sensor is disposed on an image surface of the imaging optical system.

16. An electronic device, comprising:
the image capturing apparatus of claim 15.

17. An imaging optical system comprising, in order from an object side to an image side:
a first lens element with positive refractive power having an object-side surface being convex in a paraxial region thereof;
a second lens element having an object-side surface being convex in a paraxial region thereof;
a third lens element having an image-side surface being concave in a paraxial region thereof;
a fourth lens element having an image-side surface being concave in a paraxial region thereof;
a fifth lens element having positive refractive power; and
a sixth lens element with negative refractive power having an image-side surface being concave in a paraxial region thereof, wherein an object-side surface and the image-side surface of the sixth lens element are aspheric, and the image-side surface of the sixth lens element comprises at least one convex shape in an off-axial region thereof;
wherein the imaging optical system has a total of six lens elements, there is an air gap between every two of the first lens element, the second lens element, the third lens element, the fourth lens element, the fifth lens element and the sixth lens element that are adjacent to each other;
wherein a focal length of the first lens element is f1, a focal length of the third lens element is f3, a focal length of the fourth lens element is f4, a focal length of the fifth lens element is f5, a focal length of the sixth lens element is f6, and both |f3| and |f4| are greater than |f1|, |f5| and |f6|;
wherein an axial distance between the object-side surface of the first lens element and the image-side surface of the sixth lens element is Td, a maximum image height of the imaging optical system is ImgH, an Abbe number of the third lens element is V3, an Abbe number of the fourth lens element is V4, a curvature radius of the image-side surface of the third lens element is R6, a curvature radius of the image-side surface of the fourth lens element is R8, a focal length of the imaging optical system is f, an entrance pupil diameter of the imaging optical system is EPD, and the following conditions are satisfied:

$Td/ImgH<1.25;$ $1.5<V3/V4<4.0;$ $(|R6|/|R8|)/f<10.0;$ $1.25<ImgH/EPD1.70;$ and $|f/f3|+|f/f4|<0.50.$ 18. The imaging optical system of claim 17, wherein the axial distance between the object-side surface of the first lens element and the image-side surface of the sixth lens element is Td, the maximum image height of the imaging optical system is ImgH, and the following condition is satisfied:

$Td/ImgH<1.15.$

19. The imaging optical system of claim 18, wherein the object-side surface of the sixth element is concave in a paraxial region thereof.

20. The imaging optical system of claim 18, wherein the second lens element has negative refractive power.

21. The imaging optical system of claim 17, wherein a central thickness of the third lens element is CT3, a central thickness of the fourth lens element is CT4, a central thickness of the fifth lens element is CT5, and the following condition is satisfied:

$$0.80 < CT5/(CT3+CT4) < 2.0.$$

22. The imaging optical system of claim 17, wherein the fourth lens element has an object-side surface being convex in a paraxial region thereof, and each of the object-side surface and the image-side surface of the fourth lens element has at least one inflection point in an off-axial region thereon.

23. The imaging optical system of claim 17, wherein an f-number of the imaging optical system is Fno, and the following condition is satisfied:

$$1.5 < Fno < 2.0.$$

24. The imaging optical system of claim 17, wherein a curvature radius of an object-side surface of the fifth lens element is R9, a curvature radius of an image-side surface of the fifth lens element is R10, and the following condition is satisfied:

$$0.25 < (R9+R10)/(R9-R10) < 2.0.$$

25. The imaging optical system of claim 17, wherein the focal length of the imaging optical system is f, the curvature radius of the image-side surface of the third lens element is R6, and the following condition is satisfied:

$$0.20 < f/R6 < 1.50.$$

26. The imaging optical system of claim 25, wherein the focal length of the imaging optical system is f, the curvature radius of the image-side surface of the third lens element is R6, and the following condition is satisfied:

$$0.35 < f/R6 < 1.20.$$

27. The imaging optical system of claim 17, wherein a central thickness of the third lens element is CT3, a central thickness of the fourth lens element is CT4, and the following condition is satisfied:

$$CT4/CT3 < 1.60.$$

28. The imaging optical system of claim 17, wherein a central thickness of the fourth lens element is CT4, an axial distance between the third lens element and the fourth lens element is T34, and the following condition is satisfied:

$$0.75 < CT4/T34 < 2.25.$$

29. The imaging optical system of claim 17, wherein the focal length of the first lens element is f1, the focal length of the fifth lens element is f5, the focal length of the sixth lens element is f6, and |f1| is greater than |f5| and |f6|.

30. An image capturing apparatus, comprising:
the imaging optical system of claim 17; and
an image sensor, wherein the image sensor is disposed on an image surface of the imaging optical system.

31. An electronic device, comprising:
the image capturing apparatus of claim 30.

* * * * *

UNITED STATES PATENT AND TRADEMARK OFFICE
CERTIFICATE OF CORRECTION

PATENT NO. : 9,810,880 B2  
APPLICATION NO. : 14/932006  
DATED : November 7, 2017  
INVENTOR(S) : Hsu et al.

Page 1 of 1

It is certified that error appears in the above-identified patent and that said Letters Patent is hereby corrected as shown below:

In Claim 17 (Column 36, Line 55), please delete the equation "$(|R6|HR8|)/f < 10.0$" and insert therefor: -- $(|R6|+|R8|)/f < 10.0$ --

In Claim 17 (Column 36, Line 57), please delete the equation "$1.25 < ImgH/EPD1.70$" and insert therefor: -- $1.25 < ImgH/EPD \leq 1.70$ --

In Claim 17 (Column 36, Line 59), please delete the equation "$|f/f3|+f/f4| < 0.50$" and insert therefor: -- $|f/f3|+|f/f4| < 0.50$ --

In Claim 27 (Column 38, Line 11), please delete "claim 17" and insert therefor: -- claim 25 --

Signed and Sealed this  
Third Day of July, 2018

Andrei Iancu  
*Director of the United States Patent and Trademark Office*